US011519397B2

(12) United States Patent
Douglas et al.

(10) Patent No.: US 11,519,397 B2
(45) Date of Patent: *Dec. 6, 2022

(54) RECIPROCATING INJECTION PUMP AND METHOD OF USE

(71) Applicants: Seth Douglas, Humble, TX (US); John Cody Moore, Houston, TX (US)

(72) Inventors: Seth Douglas, Humble, TX (US); John Cody Moore, Houston, TX (US)

(73) Assignee: Sherman Production Solutions, LLC, Houston, TX (US)

( * ) Notice: Subject to any disclaimer, the term of this patent is extended or adjusted under 35 U.S.C. 154(b) by 3 days.

This patent is subject to a terminal disclaimer.

(21) Appl. No.: 17/128,439

(22) Filed: Dec. 21, 2020

(65) Prior Publication Data

US 2021/0108625 A1    Apr. 15, 2021

Related U.S. Application Data

(63) Continuation-in-part of application No. 15/968,870, filed on May 2, 2018, now abandoned, which is a continuation-in-part of application No. 16/125,226, filed on Sep. 7, 2018, now Pat. No. 10,907,622.

(51) Int. Cl.
*F04B 9/02* (2006.01)
*F04B 19/22* (2006.01)
*F04B 23/06* (2006.01)
*F04B 53/16* (2006.01)
*F04B 9/04* (2006.01)

(52) U.S. Cl.
CPC ............... *F04B 19/22* (2013.01); *F04B 9/02* (2013.01); *F04B 9/047* (2013.01); *F04B 53/16* (2013.01)

(58) Field of Classification Search
CPC .......... F04B 19/22; F04B 23/06; F04B 49/02; F04B 9/047; F04B 9/02; F16H 19/04
See application file for complete search history.

(56) References Cited

U.S. PATENT DOCUMENTS

| 266,026 A | 10/1882 | Perry |
| 765,783 A * | 7/1904 | Morton |
| 768,138 A | 8/1904 | Northrup |
| 823,341 A | 6/1906 | Livingston |
| 1,123,172 A | 12/1914 | Compton |
| 1,314,728 A | 9/1919 | Ames |
| 1,362,901 A | 12/1920 | Simonton |

(Continued)

FOREIGN PATENT DOCUMENTS

| DE | 1938255 | 7/1969 |
| DE | 4200684 | 1/1992 |

(Continued)

OTHER PUBLICATIONS

"Mechanical Principles (1930) by Ralph Steiner [4min selection]" on YouTube https://youtu.be/mkQ2pXkYjRM.

(Continued)

*Primary Examiner* — Charles G Freay
(74) *Attorney, Agent, or Firm* — Ira P. Domnitz; Matthew C. Juren

(57) ABSTRACT

A reciprocating injection pump with a reciprocating block driven by a rotating gear, the gear having a substantially circular shape with gear teeth formed on the rotating gear the rotating gear is attached to a rotating motor.

17 Claims, 16 Drawing Sheets

(56) References Cited

U.S. PATENT DOCUMENTS

| | | | |
|---|---|---|---|
| 1,601,188 | A | 6/1921 | Nagel |
| 2,526,920 | A | 10/1950 | Wise |
| 2,666,396 | A | 1/1954 | Kruse |
| 3,097,605 | A | 7/1963 | Berkley |
| 3,228,472 | A | 1/1966 | Rhoads, Jr. |
| 3,283,957 | A | 11/1966 | Henderson |
| 3,327,635 | A | 6/1967 | Sachnik |
| 3,882,882 | A | 5/1975 | Preisig |
| 4,369,805 | A | 1/1983 | Tavor |
| 4,466,779 | A | 8/1984 | Nixon |
| 4,582,131 | A | 4/1986 | Plummer et al. |
| 6,135,724 | A | 10/2000 | Yoder et al. |
| 6,663,361 | B2 | 12/2003 | Kohl et al. |
| 6,789,439 | B2 | 9/2004 | Tung |
| 7,234,524 | B2 | 6/2007 | Shaw et al. |
| 7,828,007 | B2 | 11/2010 | Loubert et al. |
| 8,182,247 | B2 | 5/2012 | Gallwey |
| 8,602,746 | B2 | 12/2013 | Gallwey |
| 10,907,622 | B2 * | 2/2021 | Douglas .................. F04B 17/03 |
| 10,968,906 | B2 * | 4/2021 | Spindler ............. F04B 39/0022 |
| 2006/0207358 | A1 | 9/2006 | Tung |
| 2010/0126600 | A1 | 5/2010 | Watson |
| 2012/0292909 | A1 | 11/2012 | Eriksen |
| 2015/0285046 | A1 | 10/2015 | Barry |

FOREIGN PATENT DOCUMENTS

| | | |
|---|---|---|
| DE | 102004001795 A1 | 8/2005 |
| EP | 1553327 | 7/2005 |
| FR | 355869 | 11/1905 |
| FR | 3023893 | 7/2014 |

OTHER PUBLICATIONS

"Mangle Rack"—date unknown.
https://www.youtube.com/watch?v=g3IALYE4bZ0.
http://www.opensourcemachinetools.org/archive-manuals/Ingenious_Mechanisms_Vol.1_Jones_1930.pdf.
https://www.youtube.com/watch?v=zae2ZePQTwQ ☐.
https://www.siriuscontrols.com/responsive/fusion-purnp.html.
http://txampumps.com.
http://txampumps.com/pumps/solar/txam-hbt2-solar-pump.html.
http://www.graco.com/us/en/products/product-type/chemical-injection-equipment.html.
https://cppumps.com/pumps/.
https://www.sidewinderpumps.com/sidewinder-ac-chemical-metering-pumps/.
https://www.miltonroy.com/applications/high-pressure-methanol-chemical-injection-applications/.
https://www.heliospumps.com/products.html.
http://www.sunpumper.com.
https://youtu.be/mkQ2pXkYjRM.
https://books.google.com/books?id=JPEwAQAAMAAJ&pg=PA551&lpg=PA551&dq=simple+mangle+rack+pump&source=bl&ots=R2P8zPqTo5&sig=UaNrOmSde5pz9yAlhqjeJvXg3Wl&hl=en&sa=X&ved=2ahUKEwi5maaX4abcAhUQMd8KHe51ATY4ChDoATADegQIAhAB#v=onepage&q=simple%20mangle%20rack%20pump&f=false.
https://images.google.com/imgres?imgurl=https%3A%2F%2Fi.ytimg.com%2Fvi%2FvlKSIZ4BKGY%2Fhqdefault.jpg&imgrefurl=https%3A%2F%2Fwww.youtube.com%2Fwatch%3Fv%3DvlKSIZ4BKGY&docid=vlX12eaM9udJRM&tbnid=sljPBfnRTKnJJM%3A&vet=1&w=480&h=360&source=sh%2Fx% ☐2Fim.

\* cited by examiner

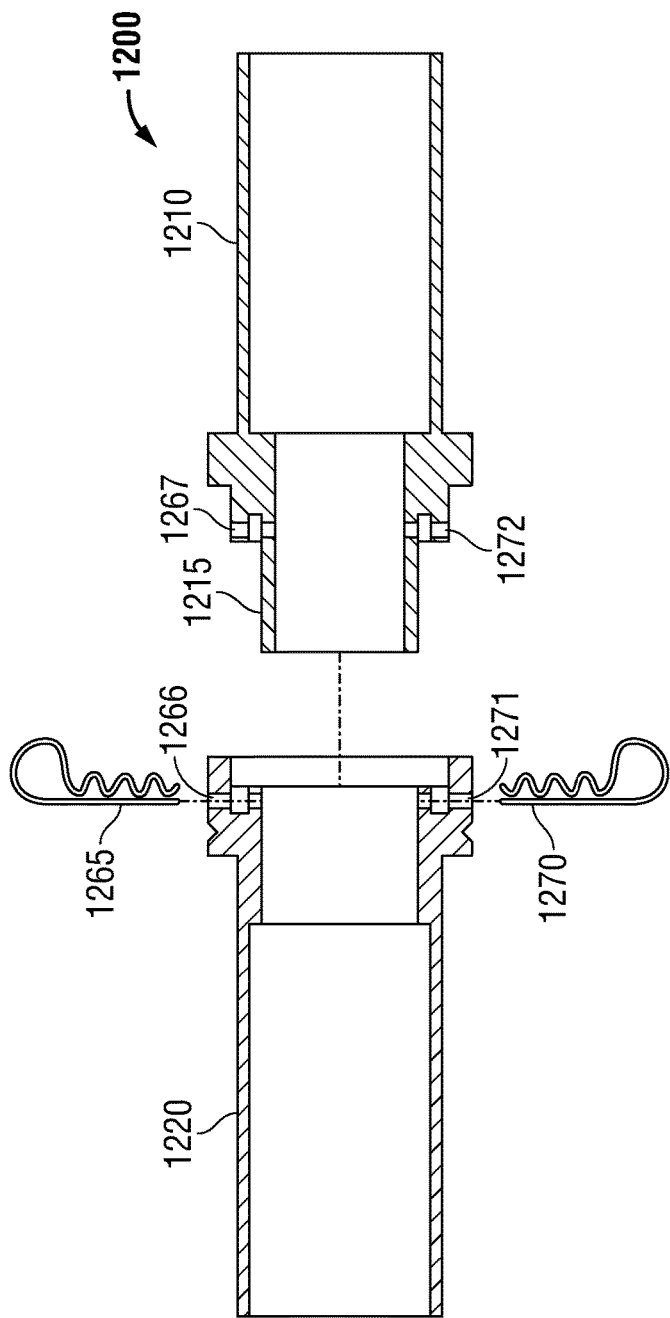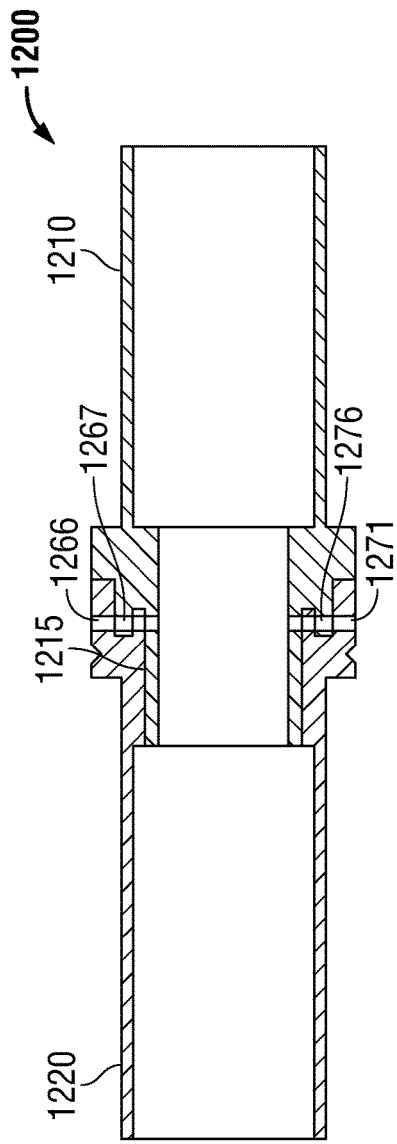
FIG. 21A
FIG. 21B

RECIPROCATING INJECTION PUMP AND METHOD OF USE

CROSS-REFERENCE TO RELATED APPLICATIONS

This patent application is a Continuation-in-Part of U.S. patent application Ser. No. 16/125,226 entitled "Improved Reciprocating Injection Pump and Method of Use" otherwise known as "A System and Method for a Reciprocating Injection Pump" filed on Sep. 7, 2018 and incorporates all content and priority of said application as if set forth in full herein. This patent application claims further priority to U.S. patent application Ser. No. 15/968,870 entitled "A System and Method for a Reciprocating Injection Pump" filed on May 2, 2018 and incorporates all content and priority of said application as if set forth in full herein.

STATEMENT REGARDING FEDERALLY SPONSORED RESEARCH

Not applicable.

BACKGROUND

The present invention generally relates to a system and method for pumping that reduces motor amp draws 30-40% over competitor pumps with a novel and unique cam-following and load bearing arrangements.

The present invention is distinguished from the following prior art:

U.S. Pat. No. 3,327,635 discloses a dump valve and is not a reciprocating pump as disclosed in the present invention.

U.S. Pat. No. 3,283,957 discloses a pressure intensifier valve and is not a reciprocating pump as disclosed in the present invention.

U.S. Pat. No. 3,228,472 discloses a computer for a wellhead and is not a reciprocating pump as disclosed in the present invention.

U.S. Pat. No. 3,097,605 discloses an assisted return mechanism for a pump jack assembly and is not a reciprocating pump as disclosed in the present invention.

U.S. Pat. No. 2,526,920 discloses a circulation pump, based on rotational force, and is not a reciprocating pump as disclosed in the present invention.

U.S. Pat. No. 1,601,188 utilizes an angle rack with disproportionate angles, with offsets. The present invention utilizes full teeth with no piston connectability with the gear.

U.S. Pat. No. 1,362,901 utilizes offset angles on a gear and mangle for one-way traffic in regard to gear movement; the present invention is a reciprocating pump.

U.S. Pat. No. 1,214,728 discloses a water pump with no mangle. Furthermore, the racks on the '728 patent are separated.

U.S. Pat. No. 1,123,172 is distinguished from the present invention as there are no catch points in a gear of the present invention; there are no springs in the present invention in the gear of mangle.

U.S. Pat. No. 823,341 utilizes multiple springs with a mechanical arrangement for reengagement and one or more of the gear or mangle teeth is moveable if necessary.

U.S. Pat. No. 768,138 is a motion conversion device, with a one-way system and offset teeth. In '138 the gear never pockets the turn, unlike the present inventive system. '138 can also only be used in low pressure systems.

U.S. Pat. No. 266,026 discloses a steam pump with just a rod. There is no gear or rack set up, unlike the present invention.

FR3023893 discloses an engaging tooth for a pressure angle. There is no rack, unlike the present invention.

EP1553327 discloses a device in which all gears turn in one direction. The present invention is bidirectional.

DE4200684 discloses a device in which there are three patterns of teeth. The present invention utilizes a one to one ratio in which the space between teeth is different.

U.S. Pat. No. App. 2010/012660 does not utilize a gear rack related to a reciprocating motion, unlike the present invention.

U.S. Pat. No. App. 2006/0207358 discloses a rack that is a push pull with suction discharge movement. The block itself is pushing and pulling the chemical. In the '358, the teeth aren't pressure bearing, and there is no external head for ejection points.

U.S. Pat. No. 7,828,007 discloses a pump control device and is not a reciprocating pump as disclosed in the present invention.

U.S. Pat. No. 7,234,524 discloses a subsea pump and is not a reciprocating pump as disclosed in the present invention.

U.S. Pat. No. 6,789,439 discloses a mangle design with a slippage in the catch and has teeth that will not engage the mangle fully on the gear, unlike the present invention.

U.S. Pat. No. 6,663,361 utilizes no mangle gearing and utilizes only a simple piston head.

U.S. Pat. No. 6,135,724 discloses a downhole pump and pump control. There is no mangle or gear as found in the present invention.

U.S. Pat. No. 4,582,131 discloses a subterranean well pump and is not a reciprocating pump as disclosed in the present invention.

U.S. Pat. No. 4,466,779 discloses a check valve and is not a reciprocating pump as disclosed in the present invention.

U.S. Pat. No. 4,369,805 does not have a gear rack and is not a reciprocating pump as disclosed in the present invention.

U.S. Pat. No. 3,882,882 discloses a flowmeter and is not a reciprocating pump as disclosed in the present invention.

US Pat. App. 2016/0285,046 discloses a control method for chemical pump and is not a reciprocating pump as disclosed in the present invention.

US Pat. 2012/0292909 discloses a circulation pump with inline valve and is not a reciprocating pump as disclosed in the present invention.

SUMMARY

In some embodiments, the invention is a reciprocating injection pump with a reciprocating block driven by a rotating gear, the gear having a substantially circular shape with at least one gear tooth formed on the rotating gear. In some embodiments, the rotating gear is attached to a rotating motor, the rotating motor having a unilateral shaft. In some embodiments the present invention is a reciprocating injection pump with a reciprocating block driven by a rotating gear, the gear having a substantially circular shape with gear teeth formed on the rotating gear the rotating gear is attached to a rotating motor.

In some embodiments, the present invention can act as a chemical injection pump for well applications that uses a gear and rack that reciprocates moving at least one connecting rod in mechanical communication with a fluid. In some embodiments, the present invention can be scaled for use in large or small applications.

In some embodiments, the fluid that can be injected is comprised of a paraffin inhibitor, iron sulfide, foamer, methanol, scale inhibitor, corrosion inhibitor, acids, water, salt water, defoamer, CO2 surfactant, surfactants, drag reducer, drilling fluid, or any other fluid that can be plunged and discharged via the check valves, plungers, pistons, or fluid end assemblies.

In some embodiments, the gear and rack, or mangle, are bidirectional and can move forward and backward. In some embodiments, the gear teeth on the gear can function at an excess of 7,000 PSI. In some embodiments, the rack is made of dissimilar metals from the gear. In some embodiments, the gear can be made of carbon alloy steel, stainless steel, bronze, brass, nickel alloy, aluminum, tool steel, titanium, any other Austenitic, Ferritic, or Martensitic steel. In some embodiments, the gear can be made of any plastic or composite strong enough to endure the reciprocating motion, both under pressure and without a pressure load. In some embodiments, the rack or mangle is made of made of carbon alloy steel, stainless, bronze, brass, nickel alloy, tool steel, titanium, any other Austenitic, Ferritic, or Martensitic steel. In some embodiments, the rack can be made of any plastic or composite strong enough to endure the reciprocating motion, both under pressure and without a pressure load. In some embodiments, the gear is pressed on in a manner to avoid key-way slippage. In some embodiments, the key-way is made into the gear.

In some embodiments, the rack and gear can be cast or made through electron discharge machining. In some embodiments, the angle of the teeth side of the gear from the center of the gear ranges from 85-98+/− degrees. In some embodiments, the mangle rack linear travel distance is the ratio of 85-89 +/− degrees multiplied by two times the circumference of the gear. In some embodiments, the angle of the teeth side of the gear from the center of the gear ranges from 65-125+/− degrees. In some embodiments, the mangle rack linear travel distance is the ratio of 65-125+/− degrees multiplied by two times the circumference of the gear. In some embodiments, the non-toothed side of a gear will fit into a transition pocket catch on a rack. In some embodiments, the present invention has an optimal pocket catch non-toothed surface area to increase energy efficiency during the linear motion transition. In some embodiments, the non-toothed aspect of the gear is between about 49-75% +/−. In some embodiments, the tooth length to gear to non-toothed diameter ratio is minimally sized to the motor shaft diameter and can be as large as needed as the diameter of the gear, teeth length and width also determine the travel distance of the gear in a linear path internally from one side of the rack to the other. For example, if the gear teeth are 0.25" wide and 0.25" long then each tooth will move the rack approximately 0.25"+/−.

In some embodiments, the design of the rack and gear allows for a low voltage motor system to allow for increased pumping efficiency by use of a friction reducing design of the rack and gear.

In some embodiments, the present invention has a motor or a lever arm attached to the gear through a shaft. In some embodiments, the shaft of the motor is attached to a pump housing. In some embodiments, the gear is centered with the rack, which is centered with the pump housing. In some embodiments, the shaft is attached with a gear with a male-female coupling. In some embodiments, the gear is pressed onto the shaft with a set screw to further secure the gear onto the shaft. In some embodiments, the gear is in mechanical communication with the rack. In some embodiments, the motor is a parallel shaft motor. In some embodiments, the motor is a dual shaft motor.

In some embodiments, the present invention utilizes a circulation head piston. In several embodiments, the present invention uses hex head materials for ease in grabbing by a wrench. It can be mounted in any direction; housing can be any three-dimensional shape.

In several embodiments, the present invention is a chemical injection pump, sometimes referred to as an injection pump, or pump, and is a contained system which is comprised of a drive unit connected to a partial sprocket which drives a mangle rack. The mangle rack is attached to a connecting rod which drives a pump piston either directly or through a mechanical mechanism.

In some embodiments, the drive unit on the injection pump can either be supplied externally through hydraulic or mechanical motion from the well site, and transmitted via drive shaft to a coupler or motor shaft which is connected to a partial sprocket internal to the contained system at the well site, or through an internal electrical motor connected directly to the drive sprocket within the housing, also via motor shaft or coupler. In several embodiments, the injection pump, containing a drive unit, partial sprocket, mangle rack, connecting rod, and pump piston, is contained within a housing which may be of a variety of shapes and sizes to provide optimum variety to the user, while sufficiently containing the unit. In several embodiments, the housing will have access ports which will allow for the maintenance and servicing of any parts contained therein. In several embodiments, the pump and associated components are capable of being mounted in any orientation to supply service to the well or other application that utilizes a pump.

In several embodiments, the motor shaft or coupler which allows for the transmission of torque from the drive unit will fit over the output shaft of the drive unit, and similarly fit into the interior diameter of a hole on the partial sprocket. In several embodiments, the motor shaft or coupler will be of a tubular design which fits over the output shaft and allows the use of a key-way to supply torque that is directly translated from the motor shaft to the gear for the driving mechanism of the pump under a load or no load application. In alternate embodiments, the interior diameter of the coupler can be of a geometric shape, to include, but is not limited to, a variety of polygons, such that a key-way is not needed to supply torque to the sprocket. The outside diameter of the coupler may contain a slot for a key-way passage allowing the partial sprocket to fit over, in order to provide the transmission of torque to the sprocket. Alternatively, in some embodiments, the outside diameter of the coupler can be of a geometric shape to include, but is not limited to, a variety of polygons, such that a key-way is not needed to supply torque to the sprocket. In several embodiments, the coupler, being integral to the transmission of torque from the drive unit to the sprocket will be of a modular design so that should the pump require an expansion of capability, such an expansion could be added by supplying an extended coupler which will drive a plurality of sprockets.

In several embodiments, the motor shaft or coupler will be of a tubular design which is either the same as, or attached, or integral, to the output shaft and is the same as, or attached, or integral, to the gear for the driving mechanism of the pump under a load or no load application. In alternate embodiments, the motor shaft and gear are milled to be a single unit such that no independent gear or motor shaft with attachment capability are needed. In several embodiments, the gear is slotted such that a milled motor shaft with a flat key (or other geometric shaped) interface designed to engage the gear slot, such that once they are engaged the motor shaft can provide torque to the gear.

In several embodiments, the partial sprocket is composed of a toothed gear side and a smooth transition side. In several embodiments, the partial sprocket applies rotational force to the mangle such that linear motion is created through the rotation of the sprocket in the rack. In several embodiments, the gear side of the sprocket will have teeth which mesh with the mangle rack in such a way that upon completing approximately one-half revolution, the transition side will engage an area of the mangle that cups the sprocket and transfers the rotational force of the sprocket from one side of the mangle rack to the other. In several embodiments, the sprocket will be designed in such a way that the trough of the sprocket's gears are no greater than the height of the crest of the gear teeth on the mangle rack.

In several embodiments, the gear teeth will compose no more than about 183+/− degrees of the circumference of the drive sprocket, the remainder of which is transitional area. In several embodiments, the sprocket teeth may be composed of either straight cut gear teeth, herring bone gear teeth, concave or convex gear teeth, or helical gear teeth to add additional stabilization or load bearing surfaces to the transfer of torque for the creation of linear motion, depending on the needs of the particular application.

In several embodiments, the depth of the gear's teeth from trough to crest may vary from 1% to 100% of the circumference of the partial sprocket's transition side. In several embodiments, the composition of the partial sprocket will be a dissimilar metal from the mangle rack. In several embodiments, the sprocket should be composed of either stainless steel, carbon alloy steel, mild steel, bronze, brass, or aluminum and associated aluminum alloys. In several embodiments, the sprocket will attach to the drive unit via a coupler which passes through the center of the sprocket via a hole. In several embodiments, the hole on the sprocket will contain either a cut-out for a key-way or contain an integrated key-way which is integral to the construction of the sprocket. In several embodiments, the sprocket may also have an interior diameter which is of a round shape, or of a geometric shape to include, but is not limited to, a variety of polygons.

In several embodiments, the mangle rack is a parallel set of rack gears separated by a length equal to the diameter of the partial sprocket as measured at the smooth transition side and gear trough. The length of the upper and lower gear racks are defined by the total linear length of the geared section of the partial gear. In several embodiments, the mangle will have a transition cup after each gear set, on opposing sides, which allow the partial gear to transition torque from one geared rack to the other during a rotation. In several embodiments, the mangle rack will be constructed in such a way that a connecting rod may be affixed to either, or both, ends to transmit linear motion to the pump mechanism.

In several embodiments, the area for the connecting rod may be sufficient for one or multiple rods, depending on the specific use. In several embodiments, the area for the connecting rods will be limited to the total height of the mangle rack. In several embodiments, the mangle rack teeth may be composed of either straight cut gear teeth, herring bone gear teeth, concave or convex gear teeth, or helical gear teeth to add additional stabilization or load bearing surfaces to the transfer of torque in the creation of linear motion, depending on the needs of the application.

In further embodiments, the mangle rack may be equipped with plates which attach to the outside of the rack, such that the teeth of the drive sprocket and mangle rack are covered, providing a safety barrier to debris and reducing the occurrence of injury associated with the moving rack and gear. The plate will also act in reducing the occurrence of the partial sprocket from sliding off or out of the mangle rack. In several embodiments, the length of the mangle rack gear teeth will not exceed the depth of the trough of the partial sprocket. The composition of the mangle rack will be a dissimilar metal from the partial sprocket. In several embodiments, the mangle rack should be composed of either stainless steel, carbon alloy steel, mild steel, bronze, brass, or aluminum and associated aluminum alloys.

In several embodiments, the connecting rod will be affixed to the end of the mangle rack to secure the rod from separating from the assembly. Such affixation can be, but is not limited to, brazing, welding, threading, and bolting the rod in place. In several embodiments, the connecting rod may be affixed directly to a piston which moves a fluid through a passage, or through a series of levers which aid in increasing thrust, or stroke to a piston which moves a fluid through a passage. In several embodiments, the composition of the connecting rod should be of a material which is rigid and may sustain repeated cycles of thrust and tension.

In several embodiments, the injection pump, when setup for operation, will receive power to the mechanisms through either non-integrated sources, like external hydraulic, electric or mechanical power from the well site, or through an integrated electric motor which receives voltage from internal batteries or external power. In several embodiments, these sources of torque, generally referred to as the drive unit, apply torque to an output shaft continuously or on demand through limit-switch, Programmable Logic Controller (PLC), Intelligent Motor Controller (IMC), Adjustable Speed Drive (ASD), or Variable Speed Drive (VSD).

In several embodiments, when appropriate, based on the settings of the controls, the drive unit will apply torque to the drive shaft coupler. In several embodiments, when torque is applied to the coupler, the partial sprocket will rotate relative to the output of the drive unit. In several embodiments, the rotation of the partial sprocket will induce the lateral motion of the mangle rack via the gear sets above or below the partial sprocket. In several embodiments, the gear sets of the mangle rack, being continuously engaged on the partial sprocket, will move along an axis perpendicular to the output shaft of the drive unit, until one rotation is complete.

In several embodiments, the gear can have a centerline starting in any position. In several embodiments, the partial sprocket, having the centerline of the gear set oriented to the 3 o'clock position, and the mangle rack supporting the transition side of the partial sprocket in the transition cup opposite the sprocket gear set, will begin rotating. In several embodiments, upon rotation, the teeth of the gear will engage the mangle rack teeth on one (but not both) side of the rack. For illustration, an example will assume a clockwise rotation. The sprocket, turning clockwise, will begin to engage the lower gear teeth of the mangle rack until such point the last teeth of the partial sprocket have disengaged from the last teeth of the mangle rack. At this point, the partial sprocket's gear set centerline is now facing 9 o'clock, and the transition side is resting in the transition cup of the mangle rack. As the gear continues to rotate, and the bottom rack's teeth have disengaged, the beginning of the partial sprocket gear set engage the upper mangle rack gear set. This engagement continues until the last teeth of the partial sprocket have disengaged, thusly resetting the sprocket back in the transition cup at the starting point of this example.

In several embodiments, the mangle rack's linear motion, perpendicular to the output shaft, will induce thrust and tension to the connecting rod which is affixed to the mangle rack.

In several embodiments, the present invention consists of a quick release connector, or decoupler, for an attachment, such as a plunger with a housing or other attachments utilized in the fluid movement field. The quick release or decoupler can be utilized when/to access pump packing material & plungers to quickly service the pump packing or change a plunger without having to unscrew the pump head from the yoke. Further, the pump head can be removed without disconnecting the suction and discharge lines from the pump head during servicing.

BRIEF DESCRIPTION OF THE DRAWINGS

For a more complete understanding of the present disclosure and the advantages thereof, reference is now made to the following descriptions to be taken in conjunction with the accompanying drawings describing specific embodiments of the disclosure, wherein:

FIG. 21A is a side view of one embodiment of a male coupler and female coupler in one embodiment of the present invention in a decoupled formation.

FIG. 21B is a side view of one embodiment of a male coupler and female coupler in one embodiment of the present invention in a coupled formation.

DETAILED DESCRIPTION

Figure 1:
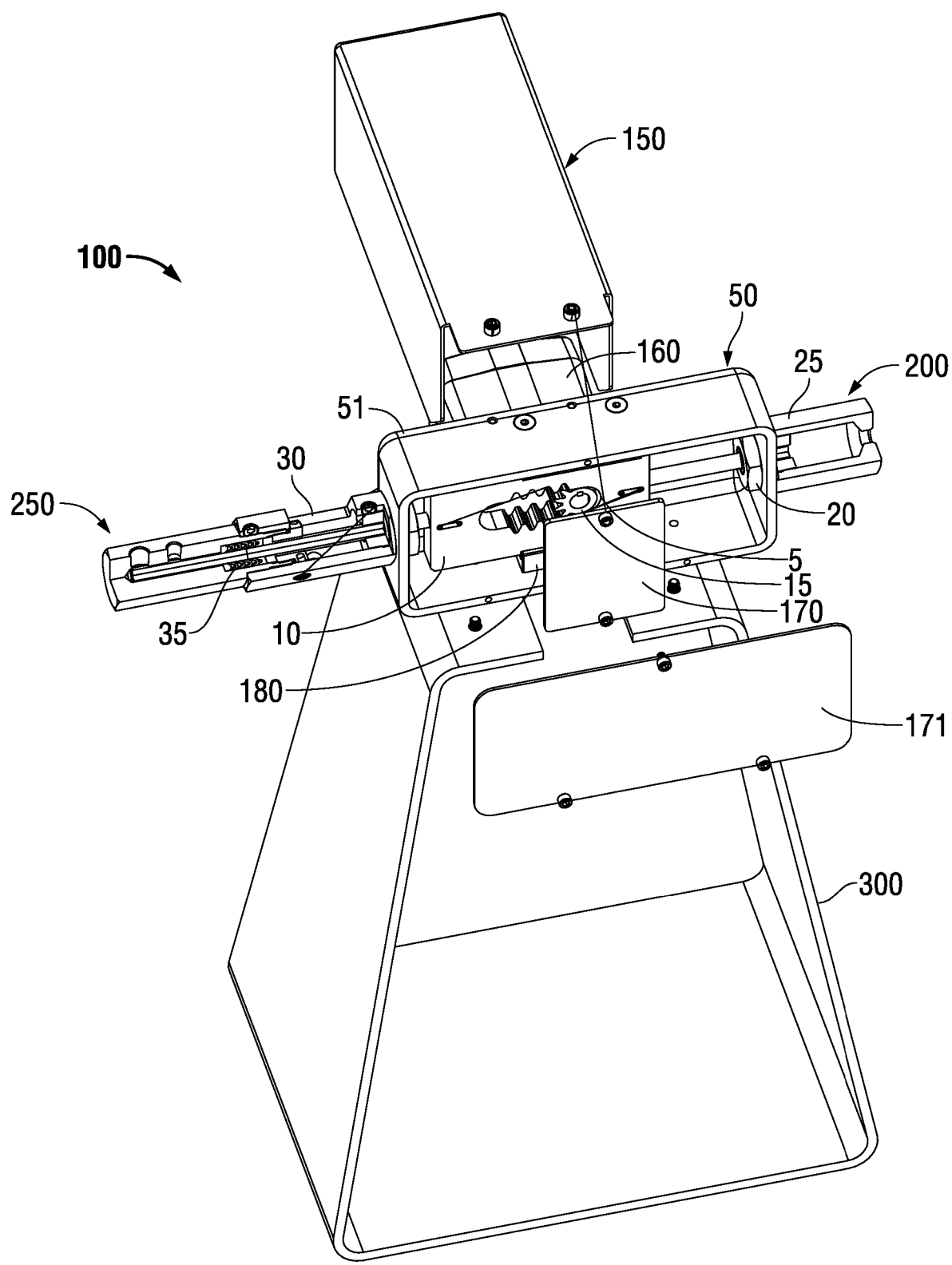
FIG. 1 is an assembled view of one embodiment of the present invention.

One or more illustrative embodiments incorporating the invention disclosed herein are presented below. Applicant has created a revolutionary and novel reciprocating injection pump.

In the following description, certain details are set forth such as specific quantities, sizes, etc. so as to provide a thorough understanding of the present embodiments disclosed herein. However, it will be evident to those of ordinary skill in the art that the present disclosure may be practiced without such specific details. In some cases, details concerning such considerations and the like have been omitted inasmuch as such details are not necessary to obtain a complete understanding of the present disclosure and are within the skills of persons of ordinary skill in the relevant art.

Referring to the drawings in general, it will be understood that the illustrations are for the purpose of describing particular embodiments of the disclosure and are not intended to be limiting thereto. Drawings are not necessarily to scale and arrangements of specific units in the drawings can vary.

While most of the terms used herein will be recognizable to those of ordinary skill in the art, it should be understood, however, that when not explicitly defined, terms should be interpreted as adopting a meaning presently accepted by those of ordinary skill in the art. In cases where the construction of a term would render it meaningless, or essentially meaningless, the definition should be taken from Webster's Dictionary, New Edition, 2016. Definitions and/or interpretations should not be incorporated from other patent applications, patents, or publications, related or not, unless specifically stated in this specification or if the incorporation is necessary for maintaining validity. "Check valve" as defined herein, is any valve or restrictive device that can allow for fluid flow in one direction, while preventing fluid flow in another direction through the valve or restrictive device. "Connector" as defined herein, may be constructed of a single solid piece unit, or of several mechanically engaged parts such as hinged levers, fulcrums, and gears as known in the art. "Motor" as defined herein may include, but is not limited to, an electric, diesel, pneumatic, compound, induction, single phase, multiphase, pump jack, parallel shaft motor, dual shaft motor, stepper motor, right angle motor, fractional or whole horsepower AC or DC motor, brushed or brushless motor(s), general purpose or explosion proof motors, planetary gear motor, lever arm or other motor known in the art. "Pressed onto" or "pressed into" as defined herein includes, but is not limited to, fused, attached, melded, soldered, compressed, wedged, screwed, dovetailed, or cast. In several embodiments, the term "pressed onto" or "pressed into" can be defined as "slipped onto the motor shaft with a cotter pin to keep the gear from moving off the shaft."

Certain terms are used in the following description and claims to refer to particular system components. As one skilled in the art will appreciate, different persons may refer to a component by different names. This document does not intend to distinguish between components that differ in name but not function. The drawing figures are not necessarily to scale. Certain features of the invention may be shown exaggerated in scale or in somewhat schematic form, and some details of conventional elements may not be shown, all in the interest of clarity and conciseness.

Although several preferred embodiments of the present invention have been described in detail herein, the invention is not limited hereto. It will be appreciated by those having ordinary skill in the art that various modifications can be made without materially departing from the novel and advantageous teachings of the invention. Accordingly, the embodiments disclosed herein are by way of example. It is to be understood that the scope of the invention is not to be limited thereby.

Turning now to FIG. 1, FIG. 1 is an assembled view of one embodiment of the present invention. As shown, one embodiment of the chemical injection pump assembly 100 is comprised of a blind yoke assembly 200, a motor complex 150, a pump head or fluid end 250, pump stand 300 and a pump housing assembly 50 (which can house mechanical components and also provide a covering for protection of mechanical parts). Various components such as motor complex 150, fluid end 250, blind yoke assembly 200 and pump housing assembly 50 can be rotated to various degrees about an X, Y, or Z axis. Blind yoke assembly 200 can also be replaced by a second fluid end 250 in various embodiments of the present invention. Fluid end 250 and a second fluid end 250 may be connected to the housing assembly 50 in some embodiments of the present invention in series to allow for a dual fluid end 250 pump. In some embodiments, the fluid end 250 is connected to the housing 50 and the piston or plunger is connected to the rack 10.

As shown, in one embodiment of the present invention, housed in the pump housing assembly 50 is gear 5. In some embodiments, gear 5 can be attached to the motor shaft 15. In some embodiments, gear 5 is either pressed or slipped on the motor shaft 15 with gear 5 having a male key-way 11 (FIG. 3) to direct the motor shaft 15 fit, which can replace an insertable key-way. In some embodiments, shaft 15 is merely pressed or mechanically attached to gear 5 in a non-key-way manner. In some embodiments, the gear 5 can be made of carbon alloy steel, stainless, bronze, brass, nickel alloy, aluminum, tool steel, titanium, any other Austenitic, Ferritic, or Martensitic steel. In some embodiments, the rack can be made of any plastic or composite strong enough to endure the reciprocating motion, both under pressure and without a pressure load. In some embodiments, the gear teeth on the gear 5 can function at an excess of 7,000 PSI. In some embodiments, the angle of the teeth of the gear 5 to the center of the gear 5 range from about 85-98+/− degrees, and in some gear 5 range from about 65-125+/− degrees. In some embodiments of the present invention gear 5 teeth further comprise pressure angle(s) (tips, width) to allow from low to high pressures in operation.

In several embodiments, the motor shaft or coupler will be of a tubular design which is either the same as or attached to the output shaft and is the same as or is attached to the gear for the driving mechanism of the pump under a load or no load application. In alternate embodiments, the motor shaft and gear are milled to be a single unit such that no independent gear or motor shaft with attachment capability are needed. In several embodiments, the gear is slotted such that a milled motor shaft with a flat key (or other geometric shaped) interface designed to engage the gear slot, such that once they are engaged the motor shaft can provide torque to the gear. In several embodiments, the motor shaft can have a flat machined onto it in order for the set screw to securely fasten to a flat surface rather than a round surface.

Figure 2:
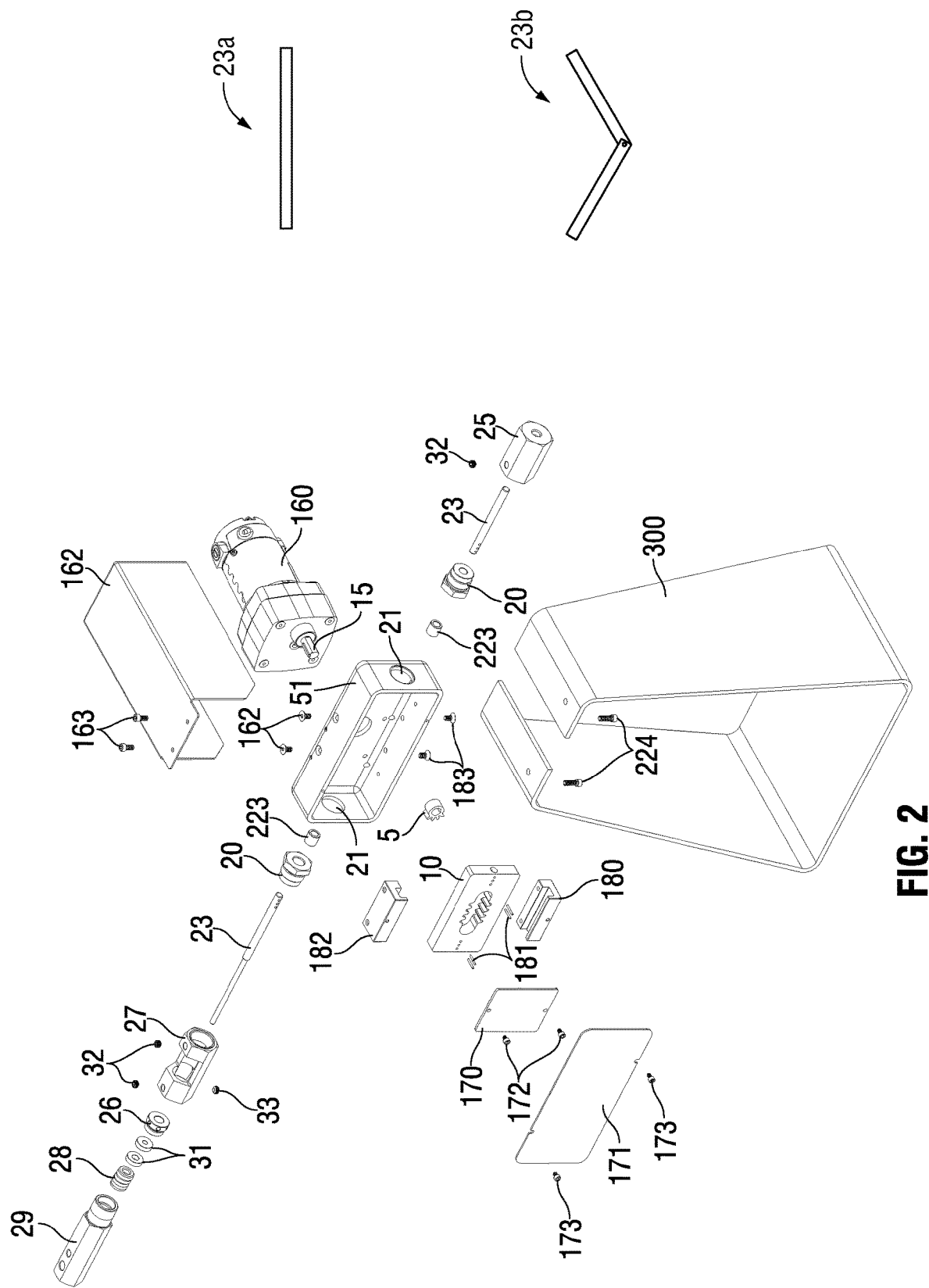
FIG. 2 is an exploded view of one embodiment of the present invention.
Figure 3:
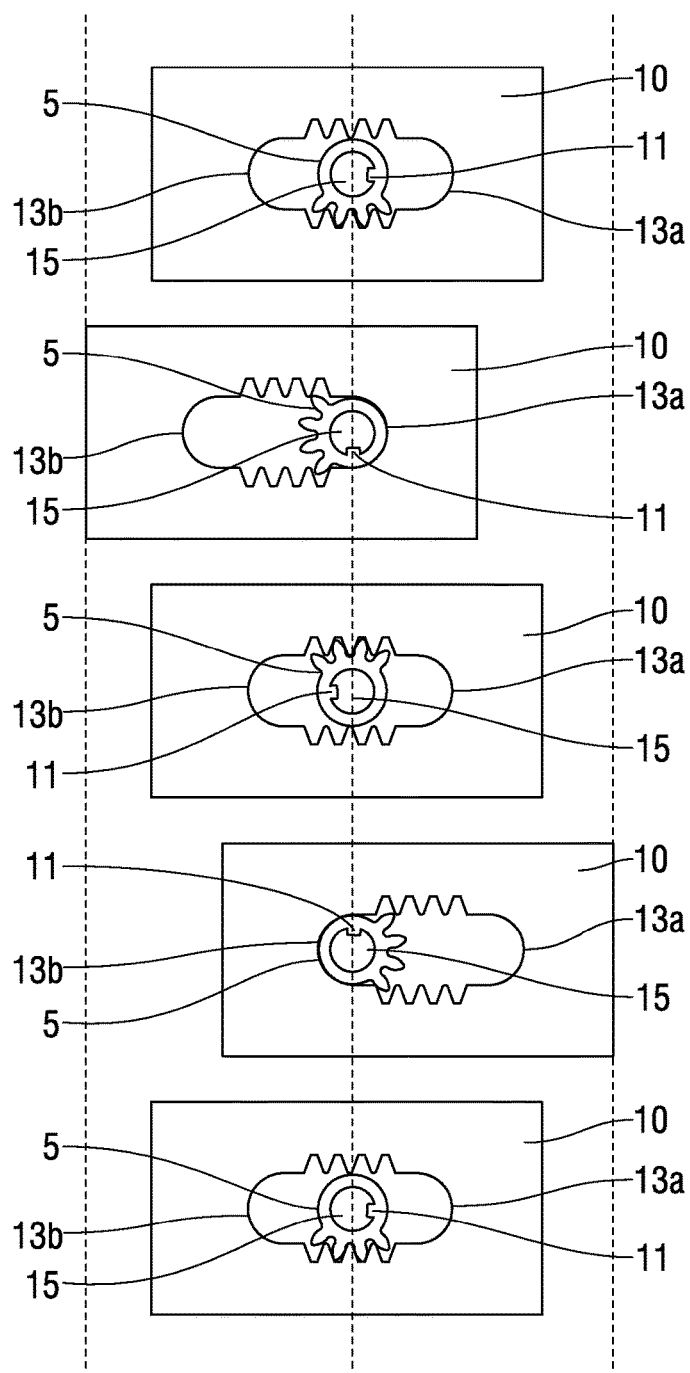
FIG. 3 is a general schematic of one operational cycle of one embodiment of a gear and mangle of the present invention.

Also shown in FIG. 1 is one embodiment of mangle rack 10. In some embodiments of the present invention, mangle rack 10 acts as a reciprocating member, or block. In some embodiments, mangle rack 10 can move linearly left or right, up or down, or back or forward in relation to gear 5 when gear 5 rotates. This movement of mangle rack 10 can induce movement of any plungers or pistons 23 (FIG. 2) attached to mangle 10. In some embodiments, the mangle 10 can be made of carbon alloy steel, stainless, bronze, brass, nickel alloy, aluminum, tool steel, titanium, any other Austenitic, Ferritic, or Martensitic steel. In some embodiments, the rack can be made of any plastic or composite strong enough to endure the reciprocating motion, both under pressure and without a pressure load. In some embodiments, mangle rack 10 is construction with transition pockets 13a and 13b. (Transition pocket 13a is referenced as "right side" and transition pocket 13b is referenced as "left side" for purposes of this disclosure). In some embodiments, transition pockets 13a and 13b are constructed to be able to interface with the smooth nontoothed segments of gear 5 (FIG. 3).

In some embodiments, mangle rack 10 moves in a non-uniform linear motion with variable velocity which is a one-dimensional motion along a straight line and can therefore be described mathematically using only one spatial dimension. The mangle rack 10 will move in this one spatial dimension perpendicular to the centerline of the power unit drive shaft 15 (FIG. 2). The non-uniform linear motion will be perpendicular to the centerline of the power unit drive shaft 15 regardless of the orientation of the completed injection pump relative to the earth.

Further illustrated is one embodiment of safety plate 170, which is utilized as a protection for gear 5 in case of a mechanical failure of gear 5 or mangle 10. Further illustrated are safety plate mounts 180. In this embodiment, safety plate mounts 180 are mounted to pump housing 51 attached to safety plate 170, as well as face plate 171. See FIG. 2. In some embodiments, the pump housing 51 can be made of carbon alloy steel, stainless, bronze, brass, nickel alloy, or any other metal capable of housing the internal mechanism.

The pump housing 51 can also be made of plastic or composite capable of housing the mechanism. In some embodiments, safety plate 170 directly protects the rack and gear motion. This protects fingers, adds mechanism safety in the event of failure or to hold the gear onto the shaft if the gear slips from the shaft while in motion. In some embodiments, face plate 171 covers all internal components and protects all internals from outside environment.

In some embodiments, the non-toothed side of a gear 5 will fit in a pocket catch on mangle 10. In some embodiments, the present invention has an optimal pocket catch non-toothed surface area to increase energy efficiency during the linear motion transition. In some embodiments, the non-toothed aspect of the gear 5 is between about 49-75% +/− of the gear's diameter. In some embodiments, the tooth length of gear 5 to nontoothed diameter ratio is determined by the length of travel required for the application. In some embodiments, the design of the mangle 10 and gear 5 allows for a low voltage motor system 160 to allow for increased pumping efficiency by use of a friction reducing design.

FIG. 1 also illustrates one embodiment of motor shaft 15. It is envisioned that motor shaft 15 can be of variant diameters and configurations such as parallel, dual shaft, gear motor, right angle motor, stepper motor, or other motor shafts as known in the art for rotating a gear 5. In some embodiments, motor shaft 15 can be made of carbon alloy steel, stainless steel, bronze, brass, nickel alloy, carbon alloy steel, stainless, bronze, brass, nickel alloy, aluminum, tool steel, titanium, any other Austenitic, Ferritic, or Martensitic steel. In some embodiments of the present invention, motor shaft 15 can extend through gear 5 and enter into a second gear 5 in a parallel pump housing assembly 50.

FIG. 1 also illustrates one embodiment of the guide bushing 20. As shown, guide bushing 20 may be constructed with lubricated bronze inserts or other materials known in the art to reduce friction on a plunger and also limit vibrational movement of a plunger.

FIG. 1 illustrates one embodiment of the blind yoke 25. As illustrated, blind yoke 25 is used for counterbalance and guide purposes. In some embodiments, blind yoke 25 houses a blind plunger that is not fluid active and is a balance for when mangle rack 10 is in operation. In some embodiments, blind yoke 25 is replaced with a second fluid end 250.

One embodiment of yoke 30 is illustrated and is used to tie a pump head 29 (FIG. 2) to the pump housing 51. In several embodiments, yoke 30 screws onto guide bushing 20 through an orifice in pump housing 51. In several embodiments, yoke 30 is prevented from rotating by a set screw 32 (FIG. 2). One embodiment of V-packing 35 is also illustrated in FIG. 1. As shown, in one embodiment, V-ring packing, a.k.a. Chevron Packing, is a mixture of polytetrafluoroethylene (PTFE) or (PFE), Delrin pieces and packing materials such as Buna, Viton (FKM), Kalrez, Aflas, or any other natural or manmade compound that has chemical or fluid compatibility and is otherwise known or not yet known to assist with creating a seal for plunging fluid or chemical. FIG. 1 illustrates one embodiment of pump housing 51. In several embodiments, pump housing 51 can be constructed of aluminum, steel, or carbon steel. Motor complex 150 can cover one embodiment of motor 160, which is used to drive gear 5. Motor 160 can be sized and selected from any motor in the art utilized to turn a gear.

Turning now to FIG. 2, FIG. 2 is a partially exploded view of one embodiment of the present invention. As shown, in one embodiment of the present invention, housed in the pump housing assembly 50 (FIG. 1) is gear 5. In some embodiments, gear 5 can be attached to the motor shaft 15.

In some embodiments, gear 5 is either pressed or slipped on the motor shaft 15 with gear 5 having a male key-way to direct the motor shaft 15 fit, which can replace an insertable key-way. In some embodiments of the present invention, mangle rack 10 acts as a reciprocating member, or block. In some embodiments, mangle rack 10 can move linearly left or right, up or down in relation to gear 5 when gear 5 rotates. This movement of mangle rack 10 can induce movement of any plungers or pistons 23 attached to mangle 10. In some embodiments, the plungers or pistons 23 can be made of carbon alloy steel, stainless steel, bronze, brass, nickel alloy, aluminum tool steel, titanium, any other Austenitic, Ferritic, or Martensitic steel. In some embodiments, the rack can be made of any plastic or composite strong enough to endure the reciprocating motion, both under pressure and without a pressure load.

In several embodiments, the motor shaft or coupler will be of a tubular design which is either the same as or attached to the output shaft and is the same as or is attached to the gear for the driving mechanism of the pump under a load or no load application. In alternate embodiments, the motor shaft and gear are milled to be a single unit such that no independent gear or motor shaft with attachment capability are needed. In several embodiments, the gear is slotted such that a milled motor shaft with a flat key (or other geometric shaped) interface designed to engage the gear slot, such that once they are engaged the motor shaft can provide torque to the gear.

Further illustrated is one embodiment of safety plate 170 which is utilized as a protection for gear 5 in case of a mechanical failure of gear 5 or mangle 10. Further illustrated is safety plate mount 180. In this embodiment, safety plate mount 180 is mounted to pump housing 51 (FIG. 1) attached to safety plate 170. In some embodiments, the safety plate mount 180 and safety plate 170 can be made of carbon alloy steel, stainless steel, bronze, brass, nickel alloy, aluminum, tool steel, titanium, any other Austenitic, Ferritic, or Martensitic steel. In some embodiments, the mangle 10 can be made of any plastic or composite.

FIG. 2 also illustrates one embodiment of motor shaft 15. It is envisioned that motor shaft 15 can be of variant diameters and configurations such as parallel, dual shaft, gear motor, right angle motor, stepper motor, or other motor shafts as known in the art for rotating a gear. As shown, guide bushing 20 may be constructed with lubricated bronze inserts 223 or other materials known in the art to reduce friction on a plunger and also limit vibrational movement of a plunger. FIG. 2 also illustrates two orifices 21 that are machined or manufactured on the sides of pump housing 51 (FIG. 1). In some embodiments, one of the two orifices 21 can act as a counter bore to match the yoke 30 or blind yoke 25 for a straight fitment. Also illustrated are screws 172 used to fasten the safety plate 170 to safety mount 180.

In several embodiments, the injection pump 100, when setup for operation, will receive power to the mechanisms through either non-integrated sources, like external hydraulic, electric or mechanical power from the well site, or through an integrated electric motor 160 which receives voltage from internal batteries or external power. In several embodiments, these sources of torque, generally referred to as the drive unit, apply torque to an output shaft continuously or on demand through limit-switch, Programmable Logic Controller (PLC), Intelligent Motor Controller (IMC), Adjustable Speed Drive (ASD), or Variable Speed Drive (VSD).

FIG. 2 illustrates one embodiment of plunger or piston rod 23. In several embodiments, plunger or piston rod 23 can be constructed with variant diameters at the fluid end of plunger or piston rod 23 to increase or decrease injection rates with physical diameter changes in the plunger or piston rod 23. Also shown is packing gland nut 26. In this embodiment of the present invention, packing gland nut 26 can be used to retain packing in the pump head 29 while the present invention is in operation. In several embodiments, there is a screw set in yoke 30 that can be used to assist with securing packing gland nut 26 while the packing gland nut 26 is under pressure.

FIG. 2 illustrates one embodiment of second yoke 27 which ties pump head 29 to pump housing 51 (FIG. 1). In this embodiment, second yoke 27 can screw into guide bushing 20 and be kept from spinning by a set screw 32. Set screw 32 can be used to prevent spinning or twisting during pump operation. One embodiment of V-packing 28 is also illustrated in FIG. 2. As shown, in one embodiment, V-ring packing, a.k.a. Chevron Packing, is a mixture of polytetrafluoroethylene (PTFE) or (PFE), Delrin pieces and packing materials such as Buna, Viton (FKM), Kalrez, Aflas, or any other natural or manmade compound that has chemical or fluid compatibility and is otherwise known or not yet known to assist with creating a seal for plunging fluid or chemical.

Figure 7:
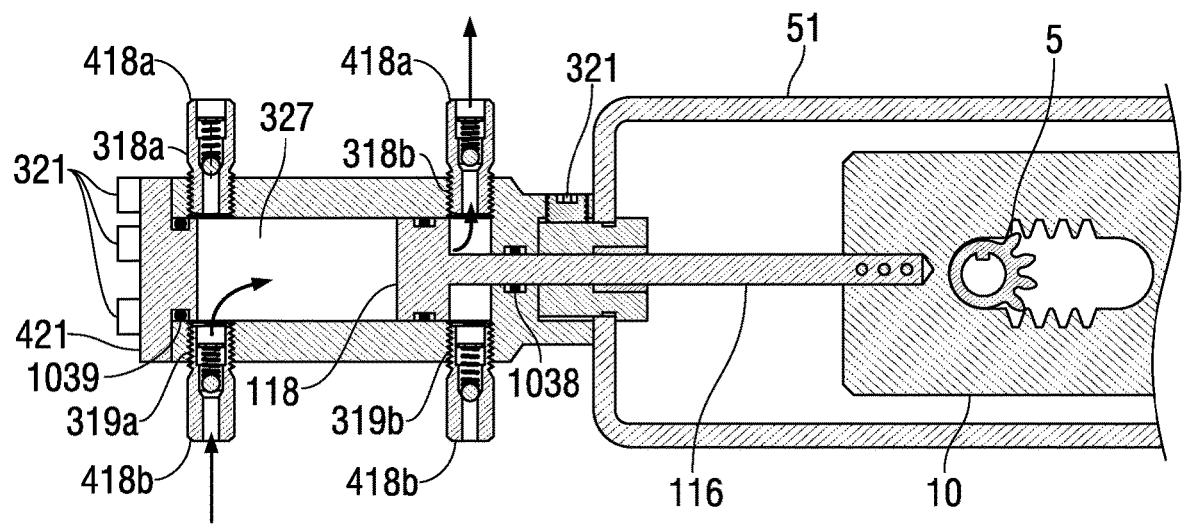
FIG. 7 is a cross sectional view of the housing and pump cylinder of one embodiment of the present invention in a right side upper discharge.
Figure 8:
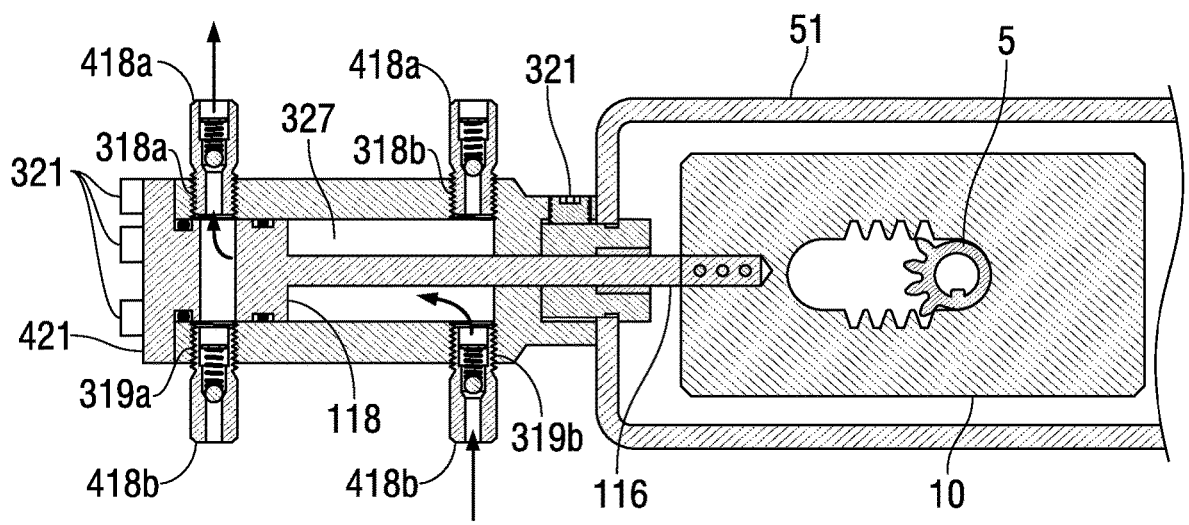
FIG. 8 is a cross sectional view of the housing and pump cylinder of one embodiment of the present invention in left side upper discharge.

FIG. 2 illustrates one embodiment of pump head 29 (also known as fluid head 29). In several embodiments, pump head 29 is utilized for the injection of fluid. In some embodiments, the fluid is pulled, or sucked, into pump head 29 from a suction check valve 418 and pushed or discharged through discharge check valve 418 (FIGS. 7 and 8). Check valve 418 is illustrated as a ball and spring check valve, however, any check valves known in the art could be utilized.

One embodiment of packing spacer 31 is illustrated, and packing spacer 31 can use polytetrafluoroethylene or other packing materials to aid with packing retention. In several embodiments, as shown, nut gland set screw 32 is designed to prevent the packing nut gland 26 from backing out or spinning while the pump is in operation.

As shown in FIG. 2, one embodiment of motor 160 can be sized and selected from any motor in the art utilized to turn a gear. In some embodiments, motor cover 162 is designed to protect the motor from direct environmental harm. As shown, in some embodiments, screws 163 fasten motor cover 162 to pump housing 51. In some embodiments, screws 183 fasten and mount motor 160 to pump housing 51. FIG. 2 also illustrates one embodiment of the present invention in which screws 172 fasten safety plate mount 180 to pump housing 51 as well as screws 173 fasten face plate 171 to pump housing 51 (FIG. 1). FIG. 2 illustrates one embodiment of a roll pin 181 used to fasten plunger or piston rod 23 to mangle 10.

Figure 4:
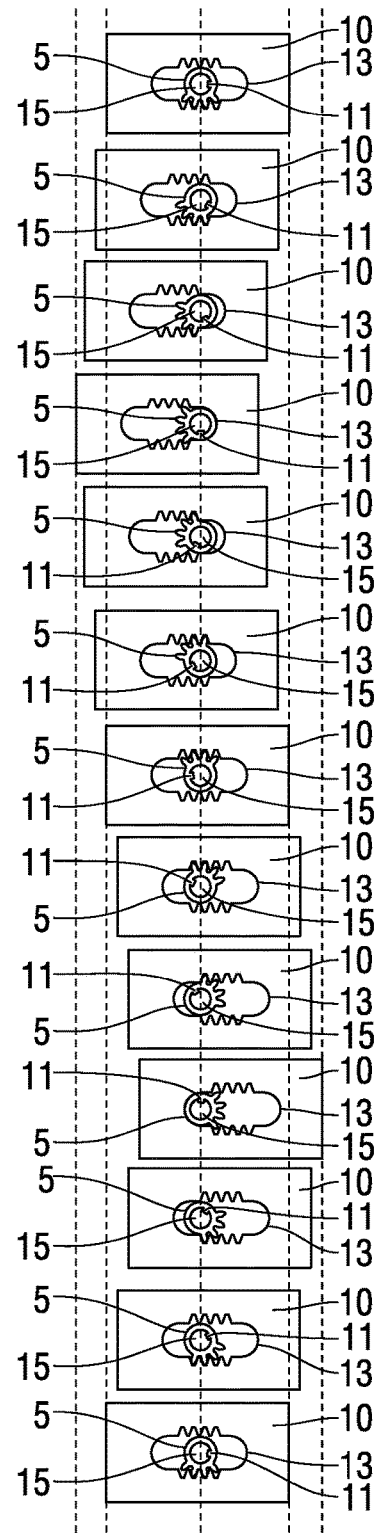
FIG. 4 is a detailed schematic of one operational cycle of one embodiment of a gear and mangle of the present invention.

FIG. 3 illustrates one general embodiment of an operational cycle of the gear 5 and mangle 10 for the present invention. As shown, in one embodiment, gear 5 has four teeth and mangle 10 has four teeth receptacles. In several embodiments, the teeth on the gear 5 and mangle 10 teeth receptacles can vary. Further illustrated in FIGS. 3 and 4 are embodiments of the male key-way 11 positioning during the gear 5 rotation.

In several embodiments, the partial sprocket, or gear 5, having the centerline of the gear set oriented to the 3 o'clock position, and the mangle rack supporting the transition side of the partial sprocket in the transition cup opposite the sprocket gear set, will begin rotating. In several embodiments, upon rotation, the teeth of the gear 5 will engage the mangle rack 10 teeth receptacles on one (but not both) side of the rack. For illustration, an example will assume a clockwise rotation. The sprocket or gear 5, turning clockwise, will begin to engage the lower gear teeth receptacles of the mangle rack 10 until such point the last teeth of the partial sprocket have disengaged from the last tooth receptacle of the mangle rack 10. At this point, the partial sprocket's gear set centerline is now facing 9 o'clock, and the transition side is resting in the transition cup 13 of the mangle rack 10. As the gear 5 continues to rotate, and the bottom rack's teeth have disengaged, the beginning of the partial sprocket gear set engages the upper mangle rack 10 gear set. This engagement continues until the last teeth of the partial sprocket have disengaged, thusly resetting the sprocket back in the transition cup at the starting point of this example. FIG. 4 illustrates a tooth by tooth completion of a gear rotation cycle.

In several embodiments, when appropriate, based on the settings of the controls, the drive unit will apply torque to the drive shaft coupler. In several embodiments, when torque is applied to the coupler, the gear 5 will rotate relative to the output of the drive unit or motor 160 (FIG. 2). In several embodiments, the rotation of the gear 5 will induce the lateral motion of the mangle rack 10 via the gear teeth above or below the gear 5. In several embodiments, the gear teeth receptacles of the mangle rack 10, being continuously engaged on the gear 5, will move along an axis perpendicular to the output shaft of the drive unit or shaft 15, until one rotation is complete.

FIG. 3 illustrates several phases of a gear cycle. In one embodiment, gear 5 is centered in a middle position with the teeth of the gear engaging mangle 10 in mangle 10 teeth receptacles. Male key-way 11 position is also indicated as is motor shaft 15 position, although variant positions on gear 5 for male key-way 11 and motor shaft 15 can be constructed.

FIG. 3 illustrates several phases of a gear cycle. In one embodiment, the smooth side of gear 5 is pocketed in mangle 10 on the "right side" transition pocket 13a which allows gear 5 to disengage momentarily from mangle 10. In this step of gear 5 rotation, mangle rack 10 is at the furthest point in one linear direction. As shown in FIG. 3, in several embodiments, mangle 10 is constructed with right side transition pocket 13a and left side transition pocket 13b. In operation, in several embodiments of the present invention, the smooth non-toothed face of gear 5 can mechanically interact and interface with transition pockets 13a and 13b at various times during the pumping cycle. Male key-way 11 position is also indicated, as is motor shaft 15 position, although variant positions on gear 5 for male key-way 11 and motor shaft 15 can be constructed.

FIG. 3 illustrates several phases of a gear cycle. In one embodiment, gear 5 is centered in a downward position with the teeth of the gear engaging mangle 10 in mangle 10 teeth receptacles. Male key-way 11 position is also indicated, as is motor shaft 15 position, although variant positions on gear 5 for male key-way 11 and motor shaft 15 can be constructed.

FIG. 3 illustrates several phases of a gear cycle. In one embodiment, the smooth side of gear 5 is pocketed in mangle 10 on the "left side" transition pocket 13b which allows gear 5 to disengage momentarily from mangle 10. In this step of gear 5 rotation, mangle rack 10 is at the furthest point in one linear direction. Male key-way 11 position is also indicated, as is motor shaft 15 position, although variant positions on gear 5 for male key-way 11 and motor shaft 15 can be constructed.

All four of the relative positions as illustrated in FIG. 3 demonstrate a complete rotational cycle of gear 5. FIG. 4 illustrates the same cycle as FIG. 3, with the added detail of illustrating how each tooth of gear 5 interacts with mangle 10 during one complete rotation of gear 5 through a pump cycle.

Figure 5:
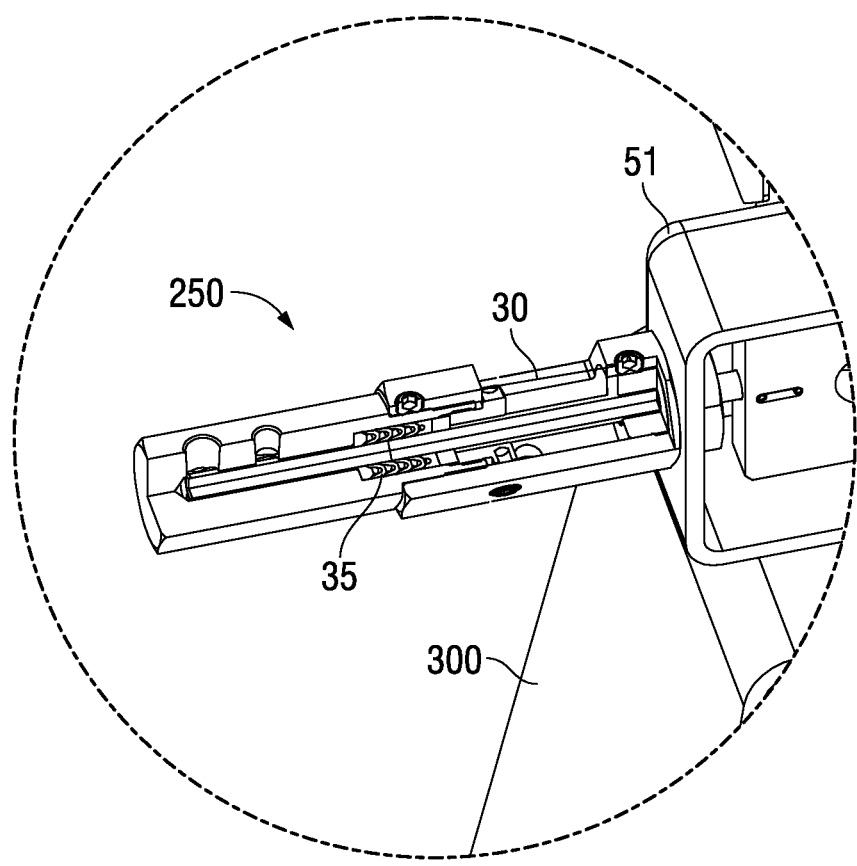
FIG. 5 is a close up cross sectional view of one embodiment of the pump head of the present invention.
Figure 6:
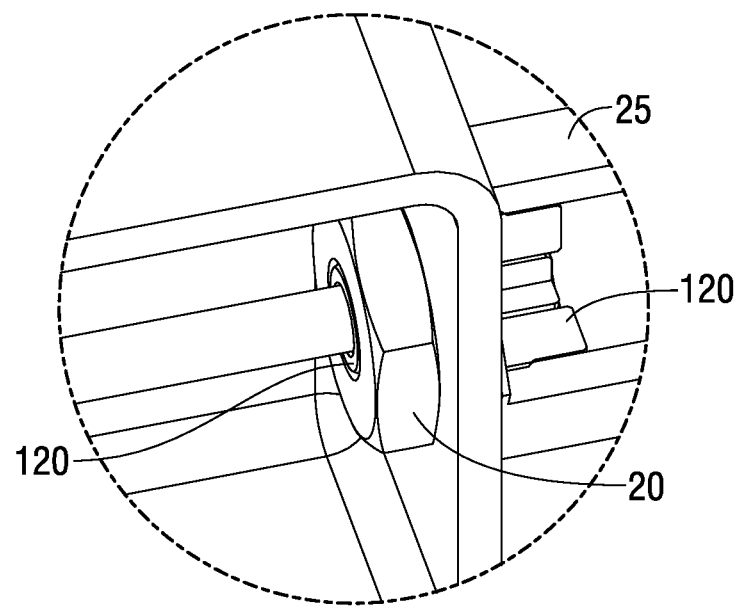
FIG. 6 is a close up cross sectional view of one embodiment of the bushing attachment of the present invention.

FIG. 5 illustrates one embodiment of the present invention in cross section as focused on the pump head or fluid end 250. As shown, in one embodiment yoke 30 ties the pump head 250 to the pump housing 51. In several embodiments, yoke 30 screws into bushing 20 (FIG. 6). One embodiment of V-packing 35 is also illustrated in FIG. 1. As shown, in one embodiment, V-ring packing, a.k.a. Chevron Packing, is a mixture of polytetrafluoroethylene (PTFE) or (PFE), Delrin pieces and packing materials such as Buna, Viton (FKM), Kalrez, Aflas, or any other natural or man-made compound that has chemical or fluid compatibility and is otherwise known or not yet known to assist with creating a seal for plunging fluid or chemical. In several embodiments, pump head or fluid end 250 can have various internal reservoir diameters for different plunger or piston rod 23 (FIG. 2) sizes. In several embodiments, the fluid end 250 is the area of the invention 100 where the fluid is pulled/plunged into the reservoir from a suction check valve 418 and pushed/discharged out of the discharge check valve 418 (FIGS. 7 and 8). Partially illustrated is pump stand 300, which in some embodiments can be used to raise the pump housing 51 from a ground position. Pump stand 300, in some embodiments, can mechanically attach to pump housing 51 through use of set screws 224 (FIG. 2).

FIG. 6 illustrates one embodiment of a close up of the bushing attachment of one embodiment of the present invention. Illustrated is one embodiment of the guide bushing 20. As shown, guide bushing 20 may be constructed with lubricated bronze inserts 223 (FIG. 2) or other materials known in the art to reduce friction on a plunger and also limit vibrational movement of a plunger. FIG. 6 illustrates one embodiment of the blind yoke 25. As illustrated, blind yoke 25 is used for counterbalance and guide purposes. Also shown is insert 120 which may be constructed with lubricated bronze inserts 223 (FIG. 2) or other materials known in the art to reduce friction on a plunger and also limit vibrational movement of a plunger. In some embodiments, guide bushing 20 is made of stainless steel or other material, can be plastic or a composite for some applications. In some embodiments, the lubricated bronze 223 (FIG. 2) is the piece that is pressed into the guide bushing 20 and acts as the plunger guide and friction and vibration reduction piece between the plunger and bushing. In some embodiments, the guide bushing 20 is made to hold the yoke 30 or blind yoke 25 to the housing 51, or to hold a head/fluid assembly 250 to housing assembly 51 (FIGS. 5 and 6).

FIG. 7 is a cross sectional view of the housing and pump cylinder of one embodiment of the present invention in a right-side upper discharge. FIG. 8 is a cross sectional view of the housing and pump cylinder of one embodiment of the present invention in a left side upper discharge. As shown, in some embodiments of the present invention, mangle rack 10 acts as a reciprocating member, or block. In some embodiments, mangle rack 10 can move linearly left or right, up or down in relation to gear 5 when gear 5 rotates (FIG. 1). This movement of mangle rack 10 can induce movement of any plungers or pistons 23 attached to mangle rod 10 (FIG. 2).

As shown, guide bushing 20 may be constructed with lubricated bronze inserts 223 or other materials known in the art to reduce friction on a plunger and also limit vibrational movement of a plunger. Also shown is one embodiment of pump housing 51 (See FIGS. 1 and 2). In this embodiment, attached to mangle 10 is piston rod or plunger shaft 116. Further attached to piston rod or plunger shaft 116 is piston head 118.

In several embodiments, the present invention has fluid chamber 327. In several embodiments, the present invention has upper discharge valves 318a and 318b. These valves can be in mechanical communication with a check valve 418 so that once fluid is discharged it will not enter the pump invention through the discharge valves 318a and 318b. In several embodiments, the present invention has lower suction valves 319a and 319b. These valves can be in mechanical communication with a check valve 418 so that once fluid is drawn into the present pump invention through suction valves 319a and 319b it will mechanically seal while being discharged through 318a or 318b, depending upon the direction of the rack at the given time. At any point in time, one suction check valve is performing its mechanical function and one discharge check valve is performing its mechanical function. The circulation pump head is dual acting, the 319a would be mechanically open, plunging fluid while the 318b is discharging fluid; 319b would be mechanically closed/sealed as well as 318a during the same rack position or directional motion. The opposite is true when the rack changes directional path; the 319b would be mechanically open, plunging fluid and 318a would be discharging fluid while 319a and 318b are mechanically sealed. Socket cap screws 321 are designed in some embodiments of the present invention to hold the end cap 421 onto the circulation pump head 29 (FIG. 2).

In several embodiments, when in operation, if the piston head 118 is in the position closest to housing 51 then fluid will discharge from discharge valve 318b and fluid will be drawn into fluid chamber 327 through suction valve 319a. (FIG. 7). In several embodiments, when in operation, if the piston head 118 is in the position furthest from housing 51, then fluid will discharge from discharge valve 318a and fluid will be drawn into fluid chamber 327 through suction valve 319b. (FIG. 8).

Further illustrated in FIGS. 7 and 8 are O-rings 1039 and O-ring 1038 which are found in some embodiments of the present invention and are designed to prevent fluid leakage while piston 118 is in operation.

In several embodiments, the present invention is a chemical injection pump 100, sometimes referred to as an injection pump, or pump, and is a contained system which is comprised of a drive unit or motor 160 connected to a partial sprocket or gear 5 which drives a mangle rack or mangle 10. The mangle rack 10 is attached to a connecting rod 15 which drives a pump piston 23 either directly or through a mechanical mechanism such as levered arm, otherwise known as a pump jack instead of motor 160 (FIG. 2).

In some embodiments, the drive unit or motor 160 on the injection pump can either be supplied externally, or internally, through hydraulic, lever arm, or mechanical motion, and transmitted via drive shaft to a coupler which is connected to a gear 5 internal to the contained system at the well site, or through an internal electrical motor 160 connected directly to the drive sprocket within the pump housing assembly 50, also via coupler.

In several embodiments, the injection pump 100, containing a drive unit or motor 160, partial sprocket or gear 5, mangle rack or mangle 10, connecting rod 15, and pump plunger or piston 23, is contained within a pump housing assembly 50 which may be of a variety of shapes and sizes to provide optimum variety to the user, while sufficiently containing the unit. In several embodiments, the pump housing assembly 50 will have access ports which will allow for the maintenance and servicing of any parts contained wherein. In several embodiments, the pump 100 and associated components are capable of being mounted in any orientation to supply service to the well. In several embodiments, pump plunger or piston is referenced as a "Connector" and in several embodiments a Connector may be constructed of several mechanically engaged parts such as hinged levers, fulcrums, and gears as known in the art.

In several embodiments, the coupler or shaft 15 which allows for the transmission of torque from the drive unit or motor 160 will fit over the output shaft of the drive unit 160, and similarly fit into the interior diameter of a hole in the gear 5. In several embodiments, the coupler or shaft 15 will be of a tubular design which fits over the output shaft on the motor and allows the use of a key-way 11 to supply torque to the gear 5.

In several embodiments, the motor shaft or coupler will be of a tubular design which is either the same as or attached to the output shaft and is the same as or attached to the gear for the driving mechanism of the pump under a load or no load application. In alternate embodiments, the motor shaft and gear are milled to be a single unit such that no independent gear or motor shaft with attachment capability are needed. In several embodiments, the gear is slotted such that a milled motor shaft with a flat key (or other geometric shaped) interface designed to engage the gear slot, such that once they are engaged the motor shaft can provide torque to the gear.

In alternate embodiments, the interior diameter of the coupler or shaft 15 can be of a geometric shape to include, but is not limited to, a variety of polygons, such that a key-way 11 is not needed to supply torque to the gear 5. The outside diameter of the coupler or shaft 15 may contain a slot for a key-way passage allowing the gear 5 to fit over, in order to provide the transmission of torque to the gear 5. In several embodiments, the coupler or shaft 15, being integral to the transmission of torque from the drive unit or motor 160 to the gear 5, will be of a modular design so that should the pump 100 require an expansion of capability, such an expansion could be added by supplying an extended coupler which will drive a plurality of sprockets.

In several embodiments, the motor shaft or coupler will be of a tubular design which is either the same as or attached to the output shaft and is the same as or attached to the gear for the driving mechanism of the pump under a load or no load application. In alternate embodiments, the motor shaft and gear are milled to be a single unit such that no independent gear or motor shaft with attachment capability are needed. In several embodiments, the gear is slotted such that a milled motor shaft with a flat key (or other geometric shaped) interface designed to engage the gear slot, such that once they are engaged the motor shaft can provide torque to the gear.

In several embodiments, the gear 5 is composed of a toothed gear side and a smooth transition side. In several embodiments, the gear 5 applies rotational force to the mangle 10 such that linear motion is created through the rotation of the gear 5 in the mangle 10. In several embodiments, the tooth side of the gear 5 will have teeth which mesh with the mangle rack 10 in such a way that upon completing approximately one-half revolution, the transition side will engage an area of the mangle 10 that cups the gear 5 at transition pockets 13a and 13b and transfers the rotational force of the gear 5 from one side of the mangle rack 10 to the other. In several embodiments, the gear 5 will be designed in such a way that the trough of the gear's teeth are no greater than the height of the crest of the gear teeth on the mangle rack 10.

In several embodiments, the gear teeth will compose no more than 183 degrees of the circumference of the gear 5, the remainder of which is transitional area. In several embodiments, gear 5 can have a variant number of teeth, and teeth can have variant length. In several embodiments, the gear 5 teeth may be composed of either straight cut gear teeth, herring bone gear teeth, concave or convex gear teeth, or helical gear teeth to add additional stabilization or load bearing surfaces to the transfer of torque for the creation of linear motion, depending on the needs of the particular application.

In several embodiments, the depth of the gear 5 teeth from trough to crest may vary from 1% to 100% of the circumference of the gear's 5 transition side. In several embodiments, the composition of the gear 5 will be a dissimilar metal from the mangle rack 10. In several embodiments, the gear 5 should be composed of either stainless steel, carbon alloy steel, mild steel, bronze, brass, or aluminum and associated aluminum alloys.

In several embodiments, the mangle rack 10 is a parallel set of rack gears separated by a length equal to the diameter of the gear 5 as measured at the smooth transition side and gear trough. The length of the upper and lower gear racks are defined by the total linear length of the geared section of the gear 5. In several embodiments, mangle 10 will have a transition cup after each gear set, on opposing sides, which allows the gear 5 to transition torque from one geared mangle rack 10 side to the other during a rotation. In several embodiments, the mangle rack 10 will be constructed in such a way that a connecting rod 23 may be affixed to either, or both, ends to transmit linear motion to the pump mechanism 100.

In several embodiments, the area for the connecting rod 23 may be sufficient for one or multiple rods depending on the specific use. In several embodiments, the area for the connecting rods 23 will be limited to the total height of the mangle rack 10. In several embodiments, the mangle rack teeth may be composed of either straight cut gear teeth, herring bone gear teeth, concave or convex gear teeth, or helical gear teeth to add additional stabilization or load bearing surfaces to the transfer of torque in the creation of linear motion, depending on the needs of the application.

In further embodiments, the mangle rack 10 may be equipped with plates 180 which attach to the outside of the rack, such that the teeth of the drive sprocket and mangle rack are covered, providing a safety barrier to debris and reducing the occurrence of injury associated with the mangle rack 10 and gear 5. In some embodiments, the plate 180 will also act in reducing the occurrence of the gear 5 from sliding off or out of the mangle rack 10. In several embodiments, the length of the mangle rack gear teeth will not exceed the depth of the trough of the gear 5. The composition of the mangle rack 10 can be a dissimilar metal from the partial gear 5. In several embodiments, the mangle rack 10 should be composed of either stainless steel, carbon alloy steel, mild steel, bronze, brass, or aluminum and associated aluminum alloys, plastic or composite.

In several embodiments, the connecting rod 23 will be affixed to the end of the mangle rack 10 to secure the rod from separating from the assembly. Such affixation can be, but is not limited to, roll pin, brazing, welding, threading, and bolting the rod in place. In several embodiments, the connecting rod may be affixed directly to a piston 118 which moves a fluid through a passage, or through a series of levers which aid in increasing thrust, or stroke to a piston 118 which moves a fluid through a passage. In several embodiments, the composition of the connecting rod 23 should be of a material which is rigid and may sustain repeated cycles of thrust and tension.

Figure 9:
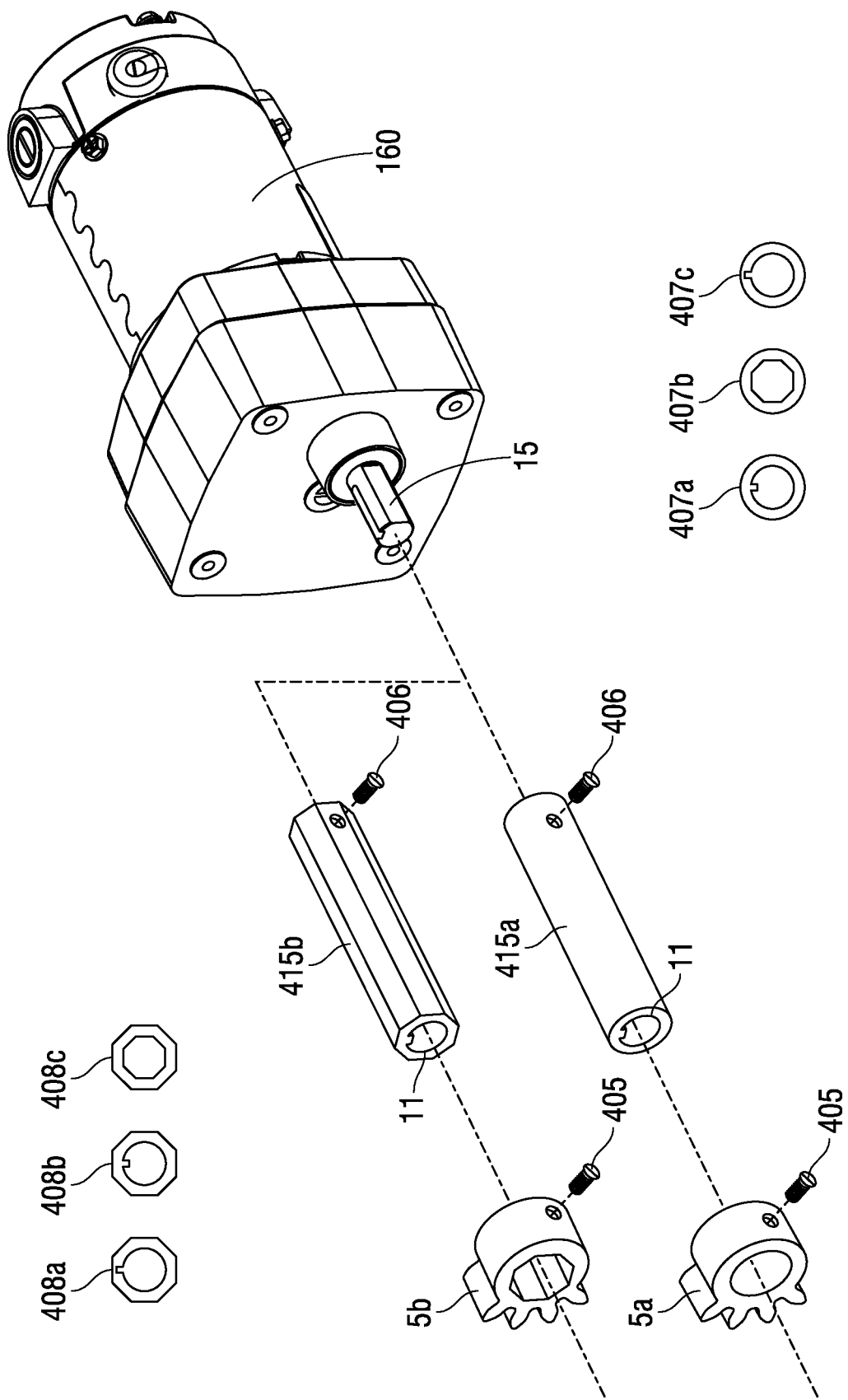
FIG. 9 shows one embodiment of the drive motor assembly of present invention in a partially exploded view.

FIG. 9 shows one embodiment of the drive motor assembly of the present invention in a partially exploded view. In several embodiments, the motor shaft or coupler 415a/415b allows for the transmission of torque from the drive unit or motor 160 will fit over the output shaft of the drive unit 15 and similarly fit into the interior diameter of an orifice 408a-c on the gear 5a-b.

In several embodiments, the motor shaft or coupler 415a will be of a tubular design which fits over the output shaft 15 and allows the use of a key-way 11 to supply torque that is directly translated from the motor shaft 15 to the gear 5a-5b for the driving mechanism of the pump under a load or no load application. In alternate embodiments, the interior diameter of the coupler can be of a geometric shape, to include, but is not limited to, a variety of polygons 415b, such that a key-way is not needed to supply torque to the sprocket. Alternatively, in some embodiments, the outside diameter of the coupler can be of a geometric shape to include, but is not limited to, a variety of polygons, such that a key-way is not needed to supply torque to the sprocket. In several embodiments, the coupler 415a-415b, being integral to the transmission of torque from the drive unit or motor 160 to the sprocket will be of a modular design so that should the pump require an expansion of capability, such an expansion could be added by supplying an extended coupler which will drive a plurality of sprockets.

In several embodiments, gear 5 (FIG. 2) can be shaped with a substantially circular interior orifice like gear 5a or have a geometrically patterned interior orifice like gear 5b. Various other examples of potential orifice shapes include semicircles 408a and 408b as well as octagonal 408c. In several embodiments of the present invention, gear 5a-5b can further secured upon coupler 415a or 415b through use of a set screw 405 that runs from the exterior of gear 5a-b through a screw thread and then interfaces on the surface of coupler 415a-b when coupler 415a-b is inserted into the orifice of gear 5a-b.

In several embodiments, coupler 415a-b can be hollow and have an interior orifice running through the center of the coupler 415a-b of variant geometric shapes including an octagon 407b or semicircles with key-ways such as 407a and 407c. In some embodiments of the present invention, coupler 415a-b can have a second threaded orifice with a screw set 406 designed to mechanically engage motor shaft 15 when coupler 415a-b is placed over motor shaft 15.

In several embodiments, the sprocket will attach to the drive unit via a coupler which passes through the center of the sprocket via a hole. In several embodiments, the hole on the sprocket will contain either a cut-out for a key-way or contain an integrated key-way which is integral to the construction of the sprocket. In several embodiments, the sprocket may also have an interior diameter which is of a round shape, or of a geometric shape to include, but is not limited to, a variety of polygons.

In several embodiments, the motor shaft or coupler will be of a tubular design which is either the same as or attached to the output shaft and is the same as or attached to the gear for the driving mechanism of the pump under a load or no load application. In alternate embodiments, the motor shaft and gear are milled to be a single unit such that no independent gear or motor shaft with attachment capability are needed. In several embodiments, the gear is slotted such that a milled motor shaft with a flat key (or other geometric shaped) interface designed to engage the gear slot, such that once they are engaged the motor shaft can provide torque to the gear.

In several embodiments, the present invention is a reciprocating pump comprising: a reciprocating block driven by a rotating gear 5 inside of a mangle rack 5 with two ends and mangle rack teeth; said rotating gear 5 further comprising; gear teeth at an angle from 65-125 degrees in relation to circumference of the gear 5, an approximately half toothed gear circumference, and an approximately half smooth gear 5 circumference; a motor shaft 15 with a first key-way; said rotating gear 15 is pressed onto said motor shaft; said gear 5 is further comprised with a second key-way 11 that mechanically engages a said first key-way of the motor shaft 15; a connector 23 for moving fluid attached to at least one of said mangle rack 10 ends; and a motor 160 attached to said motor shaft 15. In some embodiments, said connector 23 further comprises multiple pieces in mechanical communication with each other and said mangle 10. In some embodiments, said mangle rack 10 is driven by said gear 5 attached to said motor shaft 15 when said gear 5 is rotated and said gear 5 teeth engage said mangle rack 10 teeth, moving said mangle rack 10 in a linear motion. In some embodiments, said mangle rack 10 has two interfaces or transition pockets 13a and 13b on opposite ends in which said interfaces 13a and 13b are designed in a semicircle to mechanically interact with said half smooth gear 5 circumference. In some embodiments, said motor shaft 15 has no key-way. In some embodiments, said connector 23 further comprises single, plungers, multiple plungers, a piston rod, or piston rods.

Figure 10:
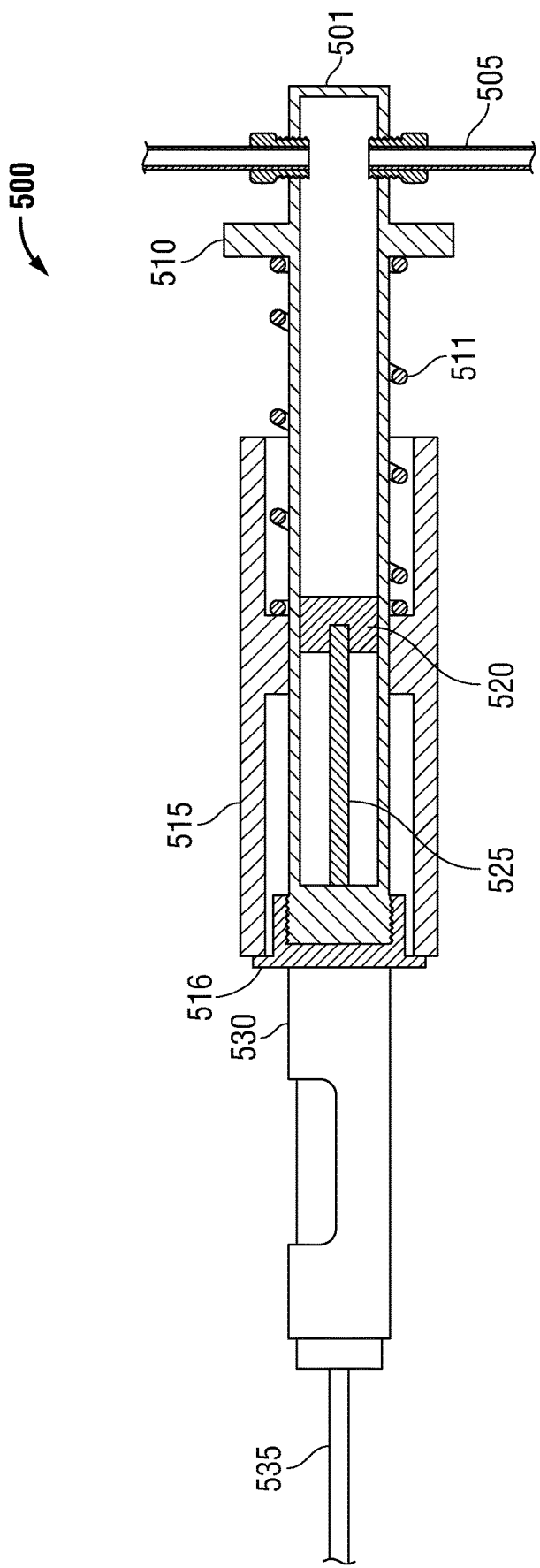
FIG. 10 is a cross sectional view of the pump cylinder of one embodiment of the present invention in left side upper discharge.

FIG. 10 is a cross sectional view of the pump cylinder and yoke of one embodiment of the present invention. On the upper left and right are supply and discharge lines. As shown is one embodiment of a pump assembly 500, as used in the present invention with a coupler 515 attached to the pump cylinder 501 The coupler 515 is held in compression with a spring 511, which prohibits the coupler 515 from loosening over time. As shown yoke 530 has a slip nut 516 which engages the coupler 515 to keep both parts secured. The coupler 515 can be unscrewed from slip nut 516 without the need to rotate the pump cylinder, thereby allowing the supply lines 505 to remain installed. In this way, the two parts, 501 and 530, may be separated for servicing of internal components without the need for a full disassembly of major components. As shown is exterior shaft 535 and connection interface or yoke 530. Further shown is pump casing 515 which houses plunger shaft 525 and plunger head 520. As shown is threaded quick connect pump assembly 500. Further shown is threaded quick connect pump housing 501. Shown is supply/discharge lines 505. Shown is tension spring stop 510. Shown is tension spring 511. Shown is threaded quick connect pump collar 515. Shown is threaded quick connect yoke collar 516. Shown is piston or plunger head 520. Shown is plunger shaft 525. Shown is threaded quick connect yoke 530. Shown is plunger shaft 535.

Figure 11:
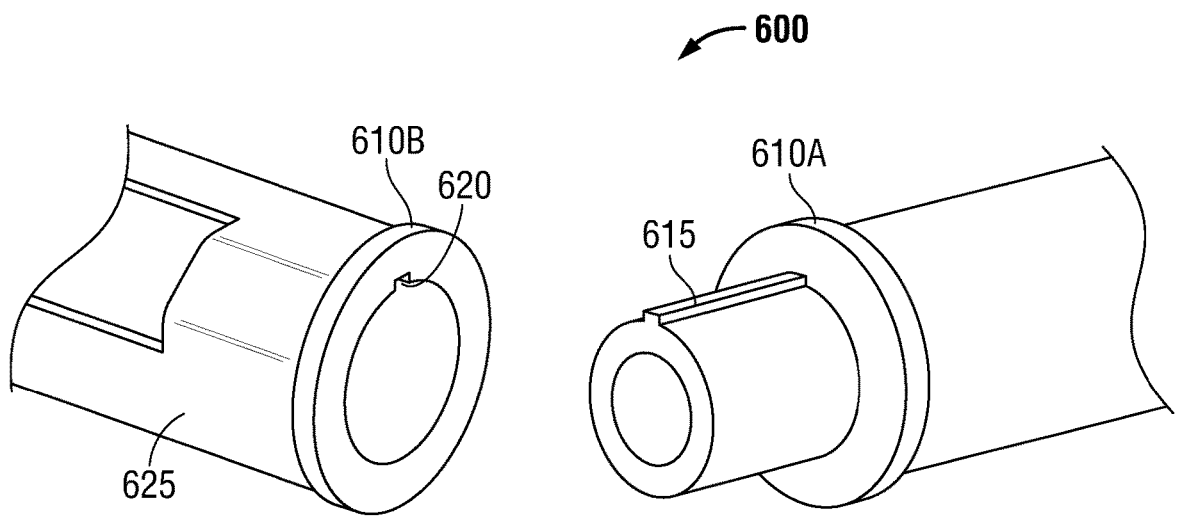
FIG. 11 is a front view of the male and female coupler fittings in one embodiment of the present invention.

FIG. 11 is a front view of the male and female coupler fittings of one embodiment of the present invention. As shown is one embodiment of female coupling 625 with interface 620 designed to interface via an integrated key-way on the male interface 615 on male coupling 610. Shown is clam collar quick connect pump assembly 600. Shown is pump quick connect clam collar shoulder 610a. Shown is yoke quick connect clam collar shoulder 610b. Shown is pump housing keyed slip joint 615. Shown is yoke key-way slip joint 620. Shown is clam quick connect yoke 625. The keyed slip joint 615 will interface inside the yoke slip joint 620. Clam collar quick connect 630 encases the yoke shoulder 610*b* and pump cylinder shoulder 610*a* on the interior recess of the clam collar and keeps the shoulders and slip joints in place with an exterior shoulder of its own. Clam collar 630 is held in position through a locking bolt 635.

Figure 12:
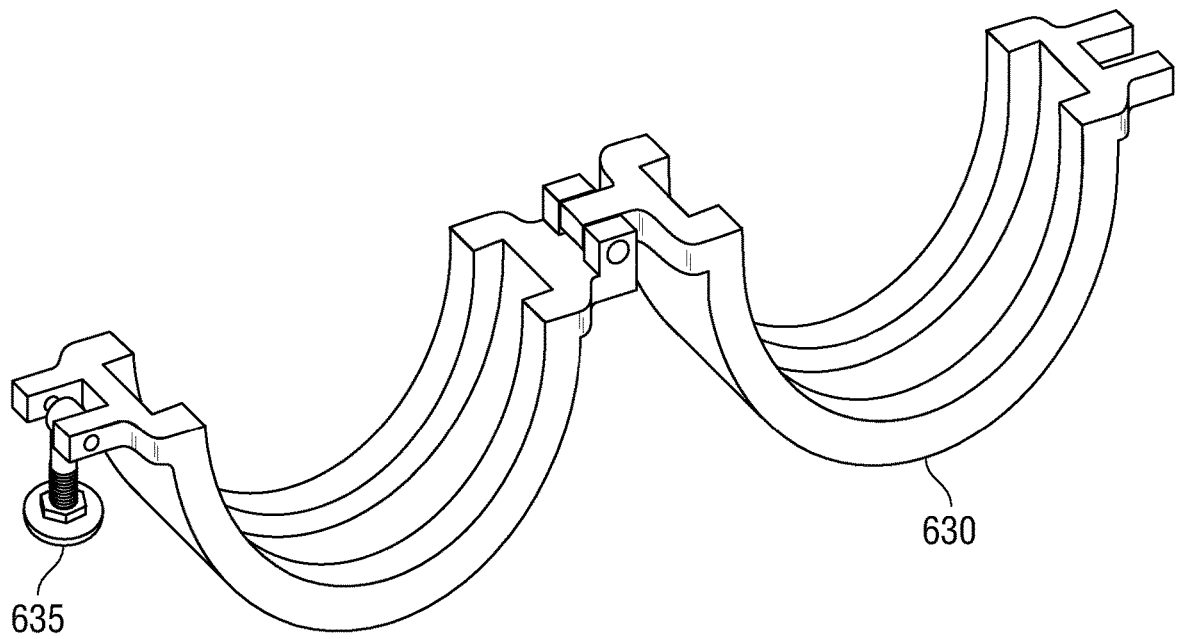
FIG. 12 is a front view of the coupler clamp in an open position in one embodiment of the present invention.

FIG. 12 is a front view of the coupler clamp of one embodiment of the present invention in an open position. As shown is decoupler clam collar 630 and the securing bolt 635. Shown is clam collar 630. Shown is clam retention bolt 635.

Figure 13:
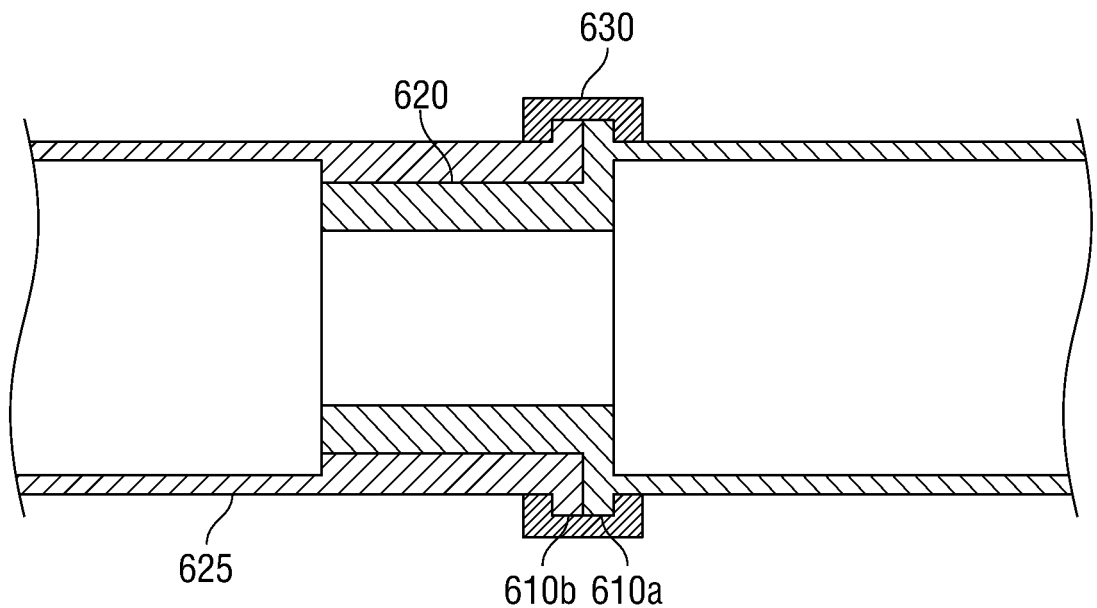
FIG. 13 is a cross sectional view of male and female coupler fittings engaging each other in one embodiment of the present invention.

FIG. 13 is a cross sectional view of male and female coupler fittings of one embodiment of the present invention engaging each other. As one embodiment of female coupling 625 with interface 620 designed to interface with male interface 615 (see FIG. 11) on male coupling 610. As shown in cross section of male interface 610*a* slidably engaged with female interface 610*b*. As shown is pump quick connect clam collar shoulder 610*a*. As shown is yoke quick connect clam collar shoulder 610*b*. As shown is yoke key-way slip joint 620. As shown is quick connect clam yoke 625. As shown is clam collar 630.

Figure 14:
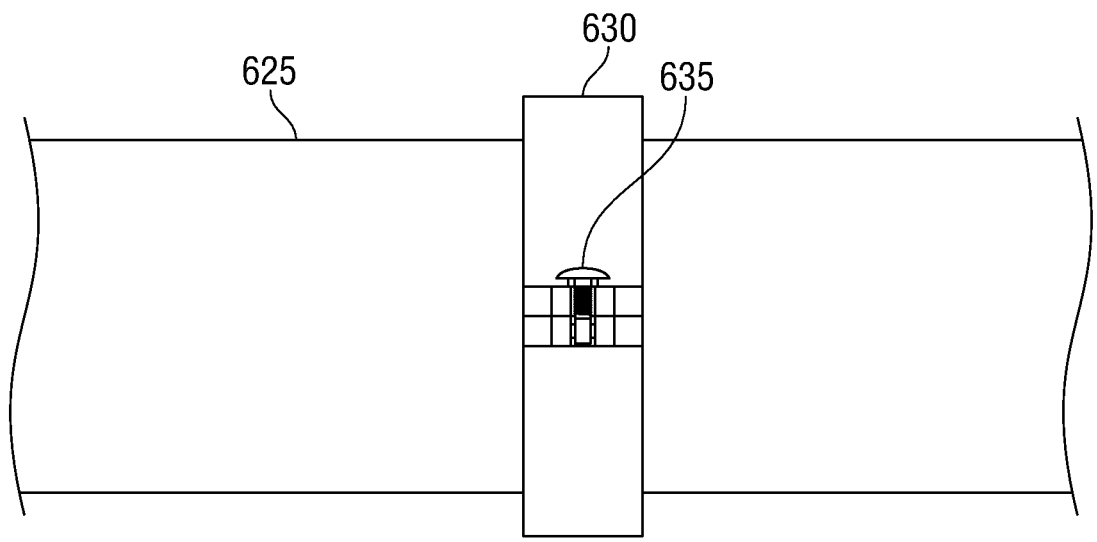
FIG. 14 is a front view of male and female coupler fittings engaging each other in one embodiment of the present invention.

FIG. 14 is a front view of the decoupler fittings of one embodiment of the present invention engaging each other. As shown, female coupling or clam yoke 625 is engaged with male coupling 620. In this embodiment of the present invention, decoupler 630 further secures the coupling of female coupling 625 with male coupling 620 via clamping around the two couplings and being secured with security tightening bolt 635. As shown is quick connect clam yoke 625. As shown is clam collar 630. As shown is clam retention bolt 635.

Figure 15A:
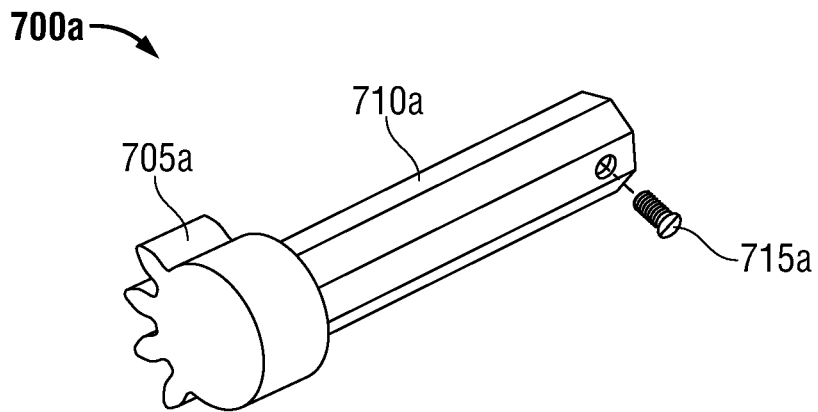
FIG. 15a is a front view of one embodiment of the shaft and gear with a multifaced shaft in one embodiment of the present invention.
Figure 15B:
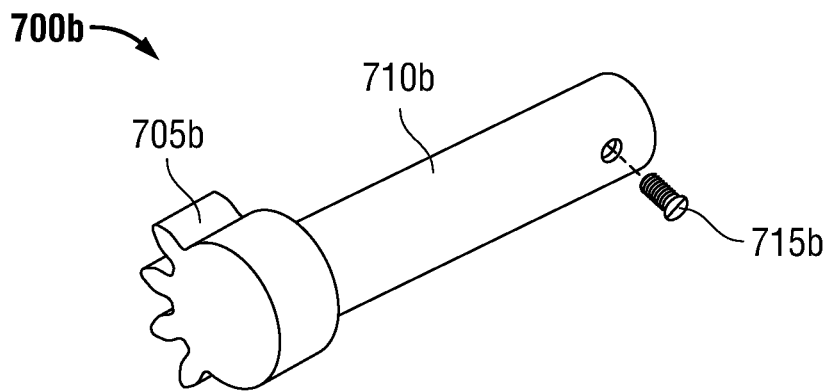
FIG. 15b is a front view of one embodiment of the shaft and gear with a single piece gear and shaft in one embodiment of the present invention.
Figure 15C:
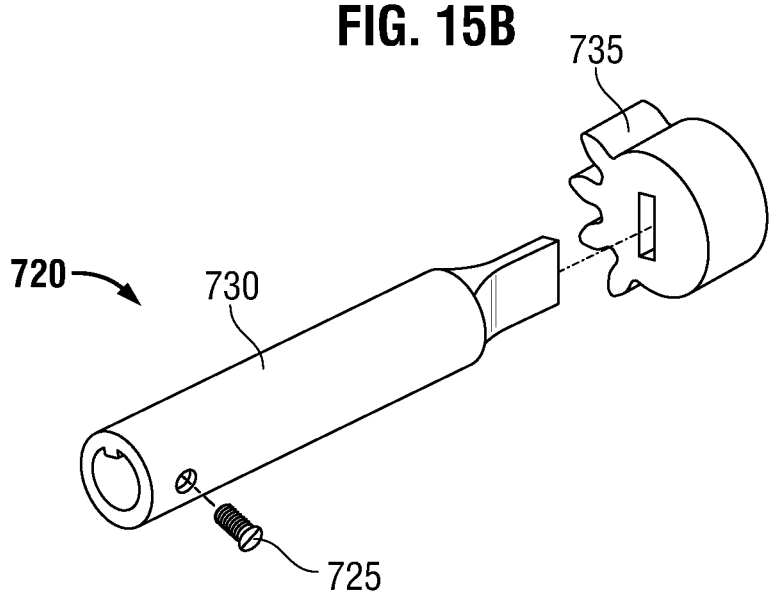
FIG. 15c is a rear view of one embodiment of the shaft and slotted gear.

FIGS. 15*a*-15*c* is a front view of several embodiments of the shaft and gear of several embodiments of the invention. As shown in FIG. 15*a* is motor shaft 710*a* with multiple milled faces as attached to gear 705*a* without any key-ways. As shown is integral gear and hex coupler 700*a*. As shown is gear 705*a*. As shown is coupler 710*a*. As shown is set screw 715*a*.

As shown in FIG. 15*b* is motor shaft 710*b* which is forged/milled as a single piece with gear 705*b* without any key-ways. As shown is integral gear and round coupler 700*b*. As shown is gear 705*b*. As shown is coupler 710*b*. As shown is set screw 715*b*.

Shown in FIG. 15*c* is motor shaft 730 with milled faces and spline to engage gear 735 which is milled with a spline interaction and engagement slit. As shown is slot coupler and gear assembly 720. As shown is set screw 725. As shown is slot coupler 730. As shown is slot coupler gear 735.

Figure 16A:
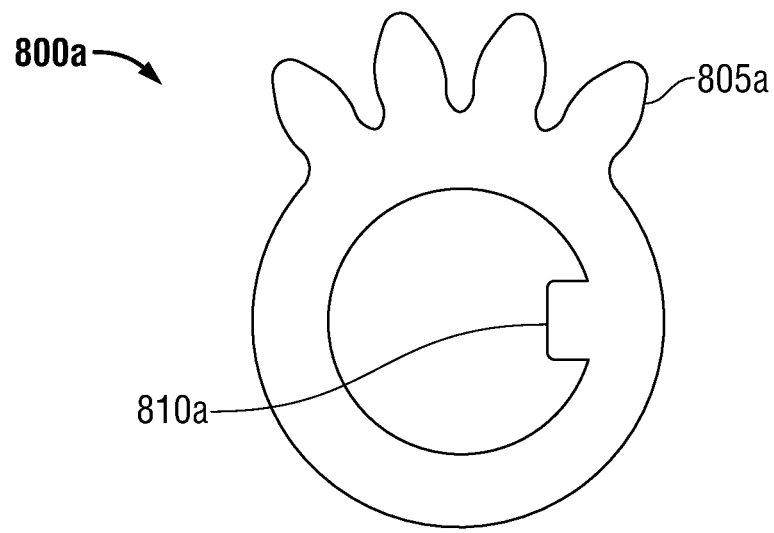
FIG. 16a is a front view of one embodiment of the gear with gear teeth in less than 90 degree gear face to smooth face ratio.
Figure 16B:
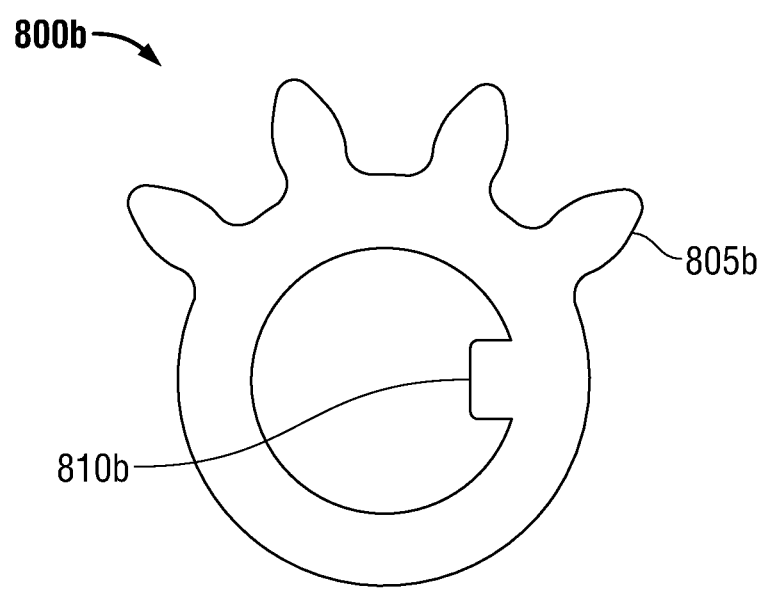
FIG. 16b is a front view of one embodiment of the gear with gear teeth in more than 90 degree gear face to smooth face ratio.

FIGS. 16*a* and 16*b* are front views of some embodiments of the gear with gear teeth. As shown in one embodiment gear 800*a* (FIG. 16*a*) has a gear tooth radius 805*a* of between 90 to 110 degrees from the circumference of gear 800*a*. As shown is short travel narrow spread gear 800*a*. As shown is gear teeth 90-45 degree spread 805*a*. As shown is integrated key 810*a*. As shown in one embodiment gear 800*b* (FIG. 16*b*) has a gear tooth radius 805*b* of between 70 to 90 degrees from the circumference of gear 800*b*. As shown is long travel wide spread gear 800*b*. *Further shown is gear teeth* 100-180 degree spread 805*b*. Further shown is integrated key 810*b*.

Figure 17:
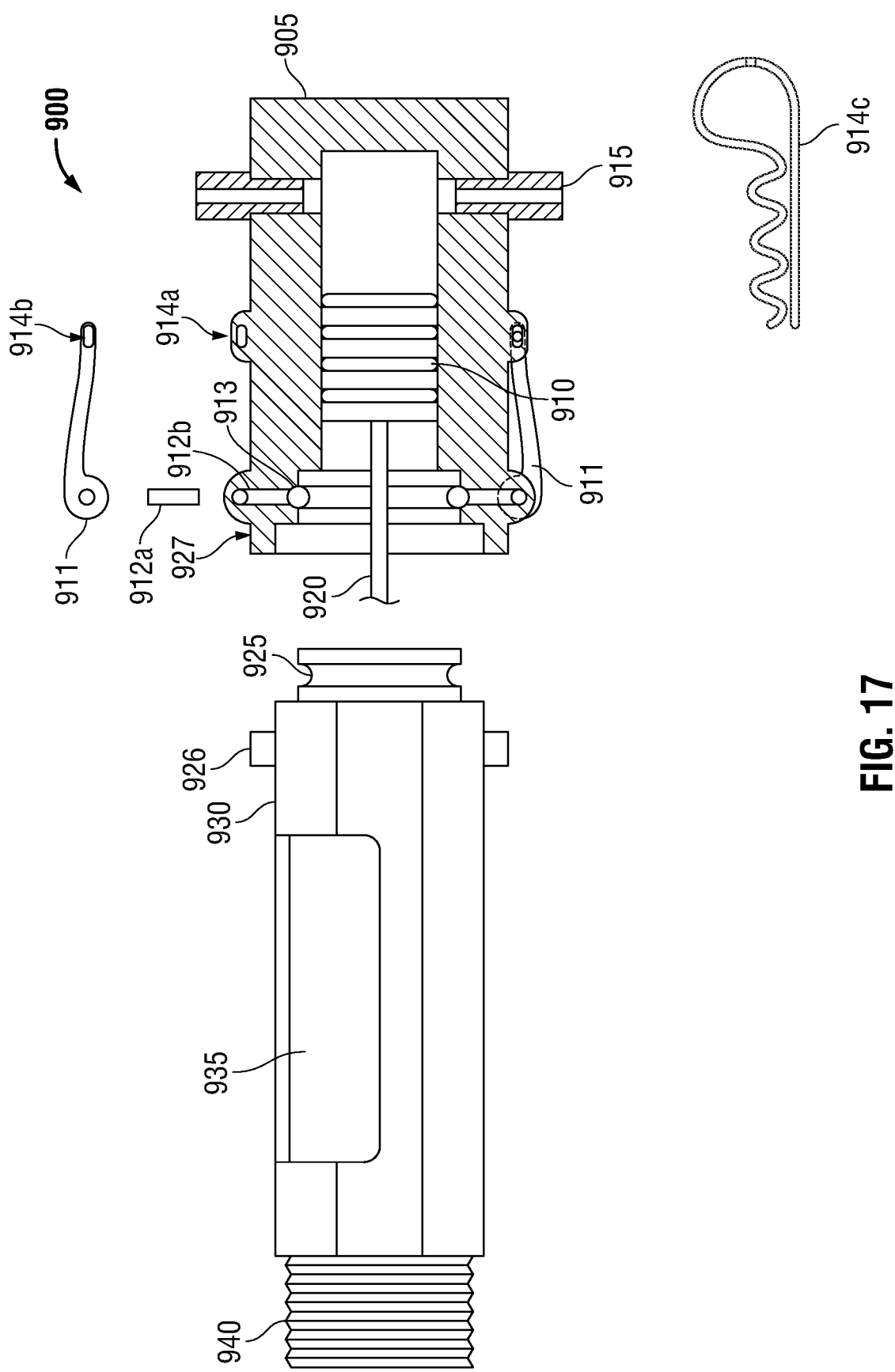
FIG. 17 is a cross sectional view of the pump cylinder of one embodiment of the present invention in left side upper discharge

FIG. 17 is a cross sectional view of the pump cylinder of one embodiment of the present invention in left side upper discharge and supply in the upper right side. Shown is detent quick connect pump assembly 900. Shown is detent quick connect pump housing 905. Shown is piston head (packing assembly shown) 910. Shown is detent arm with essentric cam 911. Shown is detent pin 912*a*. Shown is detent shaft 912*b*. Shown is detent ball 913. Shown is cotter pin lug 911. Shown is detent arm cotter hole 914*b*. Shown is cotter pin 914*c*. Shown is supply/discharge lines 915. Shown is plunger shaft 920. As shown is yoke detent groove 925. As shown is yoke anti-twist lug 926. As shown is pump housing lug 927. As shown is cotter pin lug 914*a*. As shown is detent quick connect yoke 930. As shown is plunger shaft view port 935. As show is yoke thread 940. Detent quick connect pump housing 905 slides over yoke detent groove 925 all the way past anti twist lugs 926. Pump housing anti twist receivers slot encases the anti-twist lugs 926, and indexes the pump housing such that the detent ball will seat in the detent grove. Detent arm 911 is rotated down to the cotter pin lug, activating the essentric cam, which presses down on the detent pin 912*a* and detent ball 913. This action sets the pump housing in a locked position relative to the yoke.

Figure 18:
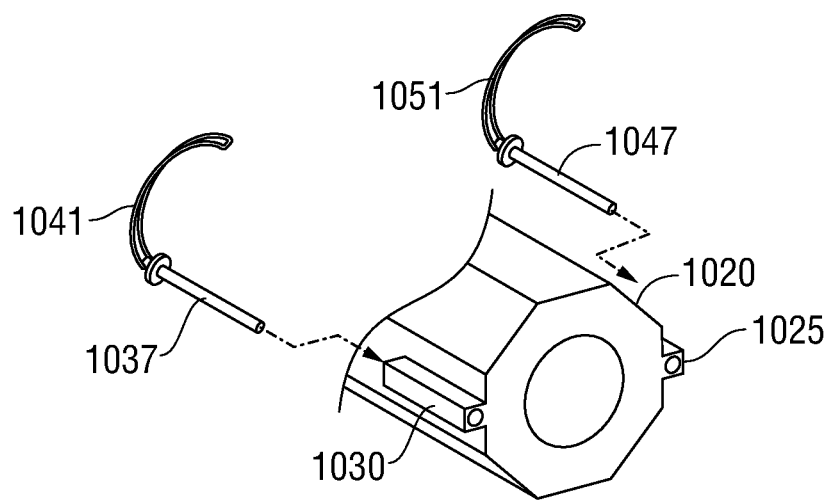
FIG. 18 is a front view of the female coupler fitting in one embodiment of the invention.

FIG. 18 is a front view of the female coupler fitting in one embodiment of the invention. As shown is yoke 1020. Further shown is pin interfaces 1025 and 1030. Further shown are pins 1037 and 1047. On pins 1037 and 1047 are securing straps 1041 and 1051. Yoke housing 1020 and pump housing 1010 each have corresponding lugs which accept retaining pins or bolts for securing each half together for quick release.

Figure 19A:
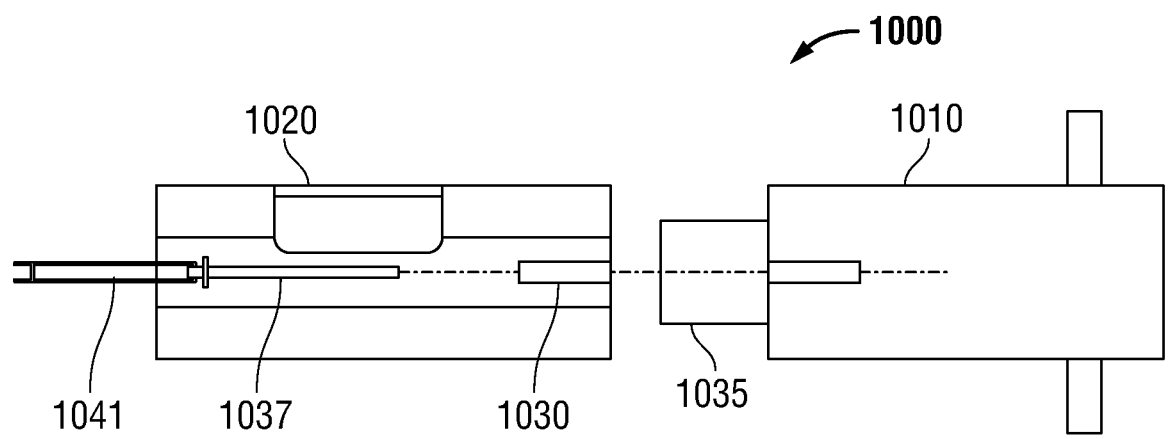
FIG. 19A is a side view of one embodiment of a male coupler and female decouple in one embodiment of the present invention in a decoupled formation.

FIG. 19A is a side view of one embodiment of a male coupler and female coupler in one embodiment of the present invention in a decoupled formation. As shown is yoke 1020 and pump head 1010. Further shown is pin interface 1030 and pump interface 1035. Further shown is pin 1037 and securing strap 1041.

Figure 19B:
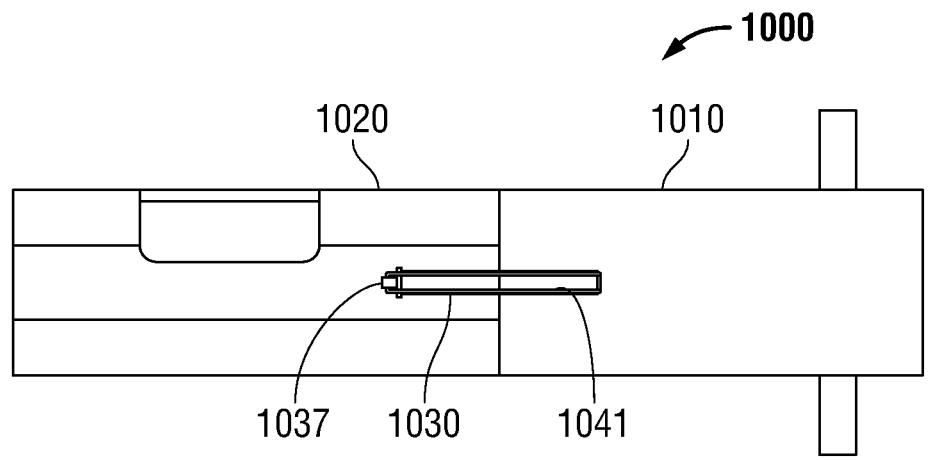
FIG. 19B is a side view of one embodiment of a male coupler and female coupler in one embodiment of the present invention in a coupled formation.

FIG. 19B is a side view of one embodiment of a male coupler and female coupler in one embodiment of the present invention in a coupled formation. As shown is yoke 1020 and pump head 1010. Further shown is pin interface 1030. Further shown is pin 1037 and securing strap 1041. Pump housing 1110 has a threaded male end with a notched external collar that slips both under and inside the yoke female threaded end. Once threaded, 1110 and 1120 create an intermeshing of collars which have set screw holes that accept bolts for retaining the two pieces.

Figure 20A:
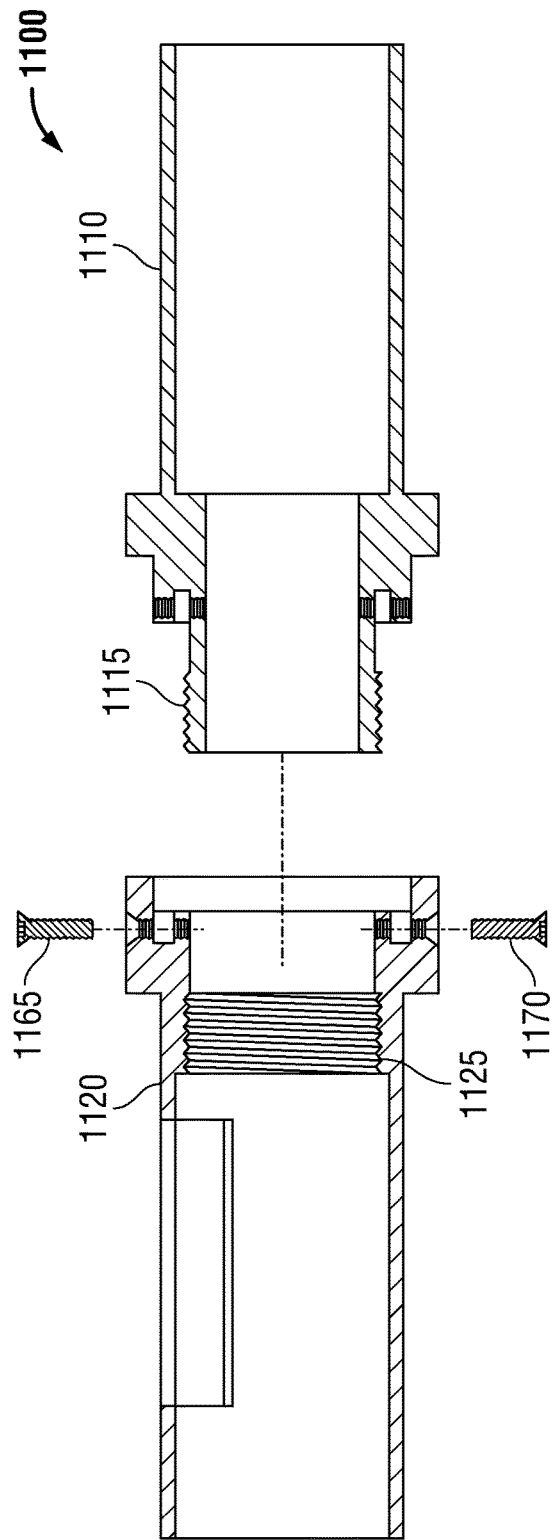
FIG. 20A is a side view of one embodiment of a male coupler and female coupler in one embodiment of the present invention in a decoupled formation.

FIG. 20A is a side view of one embodiment of a male coupler and female coupler in one embodiment of the present invention in a decoupled formation. As shown is pump head 1110 and yoke 1120. Further shown is threading 1115 and interior threading 1125. Further shown are set screws 1165 and 1170.

Figure 20B:
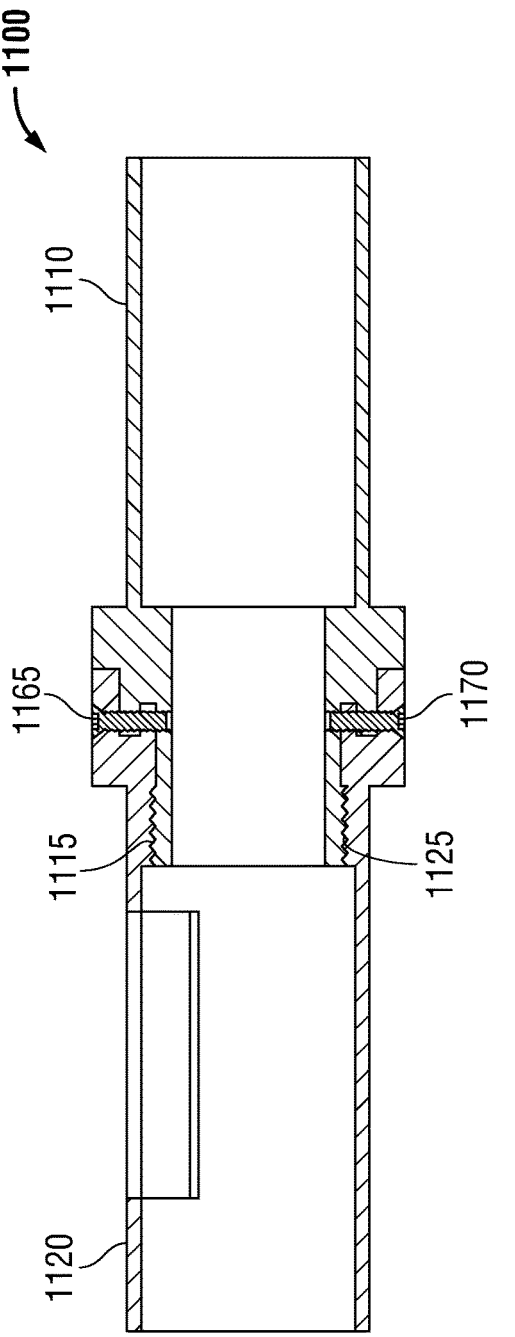
FIG. 20B is a side view of one embodiment of a male coupler and female coupler in one embodiment of the present invention in a coupled formation.

FIG. 20B is a side view of one embodiment of a male coupler and female coupler in one embodiment of the present invention in a coupled formation. As shown is pump head 1110 and yoke 1120. Further shown is threading 1115 and interior threading 1125. Further shown are set screws 1165 and 1170.

FIG. 21A is a side view of one embodiment of a male coupler and female coupler combination 1200 in one embodiment of the present invention in a decoupled formation. As shown is pump head 1210 and yoke 1220. Further shown is pump head interface 1215. Further shown are cotter pins 1265 and 1270. Further shown are orifices 1266 and 1271 with corresponding orifices 1267 and 1272.

FIG. 21B is a side view of one embodiment of a male coupler and female coupler in one embodiment of the present invention in a coupled formation. As shown is pump head 1210 and yoke 1220. Further shown is pump head interface 1215. Further shown are orifices 1266 and 1271 with corresponding orifices 1267 and 1272, which when the yoke 1220 and pump head 1210 are coupled line up so as to allow for cotter pins 1265 and 1270 (see FIG. 21*a*) to engage through both orifices 1266 and 1271 with corresponding orifices 1267 and 1272, therein joining the pump head 1210 and the yoke 1220.

Figure 22:
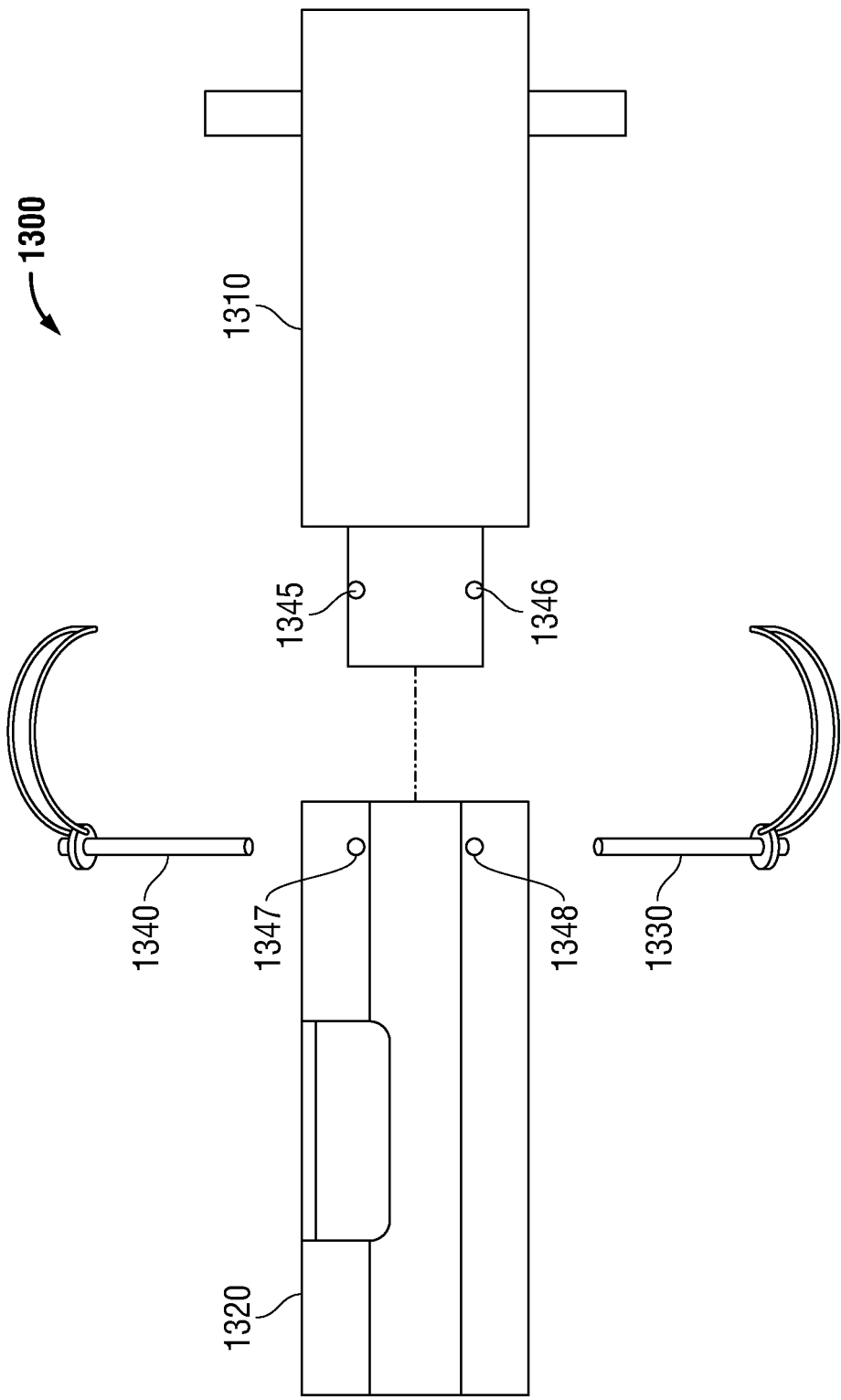
FIG. 22 is a side view of one embodiment of a male coupler and female coupler in one embodiment of the present invention in a decoupled formation.

FIG. 22 is a side view of one embodiment of a male coupler and female coupler group 1300 in one embodiment of the present invention in a decoupled formation. As shown pin lock quick connect pump assembly 1300. As shown is pin lock quick connect pump housing 1310. As shown is pin lock quick connect yoke 1320. As shown is detent pin 1330. As shown is detent pin 1340. As shown is pump housing slip joint pin shaft 1345. As shown is pump housing slip joint pin shaft 1346. As shown yoke slip joint pin shaft 1347. As shown is yoke slip joint pin shaft 1348.

While preferred embodiments have been shown and described, modifications thereof can be made by one skilled in the art without departing from the scope or teaching herein. The embodiments described herein are exemplary only and are not limiting. Some variations and modifications of the system and apparatus are possible and will become apparent to those skilled in the art once the above disclosure is fully appreciated. For example, the relative dimensions of various parts, the materials from which the various parts are made, and other parameters can be varied.

I claim:

1. A reciprocating pump comprising:
   a pumping house assembly housing;
      a rotating gear;
      a reciprocating block which is a mangle rack with two opposite ends comprising two transition pockets that cup said rotating gear and mangle rack teeth receptacles on said mangle rack;
         said rotating gear further comprising; gear teeth covering an angle from 65 to 125 degrees in relation to the gear teeth spread on the circumference of the rotating gear, and a greater than half smooth gear circumference;
      a motor shaft;
         said rotating gear is mechanically connected to said motor shaft;
      a connector for moving fluid attached to at least one of said mangle rack opposite ends;
         said connector comprising a second shaft attached to the outer surface of said reciprocating block; and
   a motor attached to said motor shaft; wherein
      multiple gear teeth engage said mangle teeth receptacles when said rotating gear is not engaging said transition pocket; and
      a fluid end connected to said pumping assembly; wherein
      said transition pockets that cup said rotating gear are designed in a semicircle to mechanically engage with said greater than_half smooth gear circumference to allow for said rotating gear to momentarily disengage said rack teeth receptacles.

2. The reciprocating pump of claim 1 further comprising:
   said motor may be selected from the group of motors consisting of parallel shaft motor, dual shaft motor, stepper motor, right angle motor, fractional or whole horsepower AC or DC motor, brushed or brushless motor, explosion proof motors, or planetary gear motor.

3. The reciprocating pump assembly of claim 1 wherein, an activation of said motor results in the rotation of said motor shaft, resulting in the rotation of said rotating gear which interacts mechanically with said mangle rack teeth, resulting in the axial or reciprocating motion of said mangle rack and the attached connector, which pumps fluid out of the reciprocating pump assembly.

4. The reciprocating pump assembly of claim 1 further comprising a coupling between a pump head and a yoke, providing a quick disconnect between the pump head and the yoke, wherein the yoke is attached to the pump housing assembly.

5. The reciprocating pump of claim 1, wherein said gear teeth further comprise:
   a pressure angle to allow from no pressure to 7,000 PSI pressures in operation.

6. The reciprocating pump of claim 1, wherein
   said mangle rack is driven by said gear attached to said motor shaft when said gear is rotated and said gear teeth engage said mangle rack teeth, moving said mangle rack in a linear motion.

7. The reciprocating pump of claim 6, wherein said connector further comprises a single plunger, or multiple plungers.

8. The reciprocating pump of claim 7, wherein when said gear drives the mangle rack, said mangle rack moves the connector to create suction on a back movement and discharge on a forward movement.

9. The reciprocating pump of claim 1, wherein said mangle rack drives multiple connectors.

10. A method for pumping a fluid using a reciprocating pump comprising the steps of:
   activating a reciprocating pump comprising;
   a pumping house assembly housing;
   a rotating gear;
      a reciprocating block which is a mangle rack with two opposite ends comprising two transition pockets that cup said rotating gear and mangle rack teeth receptacles on said mangle rack;
         said rotating gear further comprising; gear teeth covering_an angle from 65 to 125 degrees in relation to the gear teeth spread on the circumference of the rotating gear and a smooth gear circumference covering a complimentary angle between 235 to 295 degrees opposite and in relation to the gear teeth spread on the circumference of the rotating gear;
   a motor shaft;
      said rotating gear is mechanically connected to said motor shaft;
   a connector for moving fluid attached to at least one of said mangle rack opposite ends;
      said connector comprising a second shaft attached to the outer surface of said reciprocating block; and
   a motor attached to said motor shaft; wherein
      activation of the motor causes the motor shaft to rotate, causing said gear to rotate and engage the gear teeth with said mangle rack teeth, moving said mangle and said attached connectors in a reciprocating pumping motion; wherein,
      multiple gear teeth engage said mangle teeth receptacles when said rotating gear is not engaging said transition pocket; and
      a fluid end connected to said pumping assembly; wherein
      said transition pockets that cup said rotating gear are designed in a semicircle to mechanically engage with said half smooth gear circumference to allow for said rotating gear to momentarily disengage said rack teeth receptacles.

11. The method of claim 10 further comprising:
said motor may be selected from the group of motors consisting of parallel shaft motor, dual shaft motor, stepper motor, right angle motor, fractional or whole horsepower AC or DC motor, brushed or brushless motor, explosion proof motors, or planetary gear motor.

12. The reciprocating pump assembly of claim 10 further comprising a coupling between a pump head and a yoke, providing a quick disconnect between pump head and the yoke, wherein the yoke is attached to the pump housing assembly.

13. The method of claim 10, wherein said gear teeth further comprise:
a pressure angle to allow from no pressure to 7,000 PSI low to high pressures in operation.

14. The method of claim 10, wherein
said mangle rack is driven by said gear attached to said motor shaft when said gear is rotated and said gear teeth engage said mangle rack teeth, moving said mangle rack in a linear motion.

15. The method of claim 14, wherein said connector further comprises a single plunger, or multiple plungers.

16. The method of claim 15, wherein when said gear drives the mangle rack, said mangle rack moves the connector to create suction on a back movement and discharge on a forward movement.

17. The method of claim 10, wherein said mangle rack drives multiple connectors.

\* \* \* \* \*